(12) United States Patent
Shibata et al.

(10) Patent No.: US 12,115,467 B2
(45) Date of Patent: Oct. 15, 2024

(54) AMINE SEPARATION METHOD USING LIQUID CHROMATOGRAPHY

(71) Applicant: DAICEL CORPORATION, Osaka (JP)

(72) Inventors: Toru Shibata, Tokyo (JP); Satoshi Shinkura, Tokyo (JP); Atsushi Ohnishi, Tokyo (JP)

(73) Assignee: Daicel Corporation, Tokyo (JP)

( * ) Notice: Subject to any disclaimer, the term of this patent is extended or adjusted under 35 U.S.C. 154(b) by 441 days.

(21) Appl. No.: 17/617,059

(22) PCT Filed: Jun. 12, 2020

(86) PCT No.: PCT/JP2020/023153
§ 371 (c)(1),
(2) Date: Dec. 7, 2021

(87) PCT Pub. No.: WO2020/251003
PCT Pub. Date: Dec. 17, 2020

(65) Prior Publication Data
US 2022/0339555 A1    Oct. 27, 2022

(30) Foreign Application Priority Data

Jun. 14, 2019 (JP) ................................. 2019-110811
Dec. 4, 2019 (JP) ................................. 2019-219615

(51) Int. Cl.
| | | |
|---|---|---|
| B01D 15/36 | (2006.01) | |
| B01D 15/16 | (2006.01) | |
| B01D 15/32 | (2006.01) | |
| B01D 15/38 | (2006.01) | |
| B01J 20/28 | (2006.01) | |
| B01J 20/286 | (2006.01) | |
| B01J 20/29 | (2006.01) | |
| B01J 20/32 | (2006.01) | |
| B01J 41/20 | (2006.01) | |
| G01N 30/02 | (2006.01) | |

(52) U.S. Cl.
CPC .......... *B01D 15/36* (2013.01); *B01D 15/166* (2013.01); *B01D 15/32* (2013.01); *B01D 15/38* (2013.01); *B01D 15/3833* (2013.01); *B01J 20/286* (2013.01); *B01J 20/29* (2013.01); *B01J 20/3204* (2013.01); *B01J 20/321* (2013.01); *B01J 20/3212* (2013.01); *B01J 20/3219* (2013.01); *B01J 20/3255* (2013.01); *B01J 41/20* (2013.01); *G01N 30/02* (2013.01); *G01N 2030/027* (2013.01)

(58) Field of Classification Search
CPC .. B01D 15/166; B01D 15/36; B01D 15/3833; B01D 15/32; B01D 15/38; B01J 20/286; B01J 20/3204; B01J 20/321; B01J 20/3212; B01J 20/3255; B01J 20/29; B01J 20/3219; B01J 41/20; G01N 2030/027; G01N 30/02
See application file for complete search history.

(56) References Cited

U.S. PATENT DOCUMENTS

| | | |
|---|---|---|
| 4,942,149 A | 7/1990 | Shinbo et al. |
| 2002/0019491 A1 | 2/2002 | Bruening et al. |
| 2004/0132998 A1 | 7/2004 | Bruening et al. |
| 2013/0204014 A1 | 8/2013 | Nishihara et al. |

FOREIGN PATENT DOCUMENTS

| | | |
|---|---|---|
| JP | H0269472 A | 3/1990 |
| JP | 2003-535819 A | 12/2003 |
| JP | 2006-516928 A | 7/2006 |
| WO | 2012/050124 A1 | 4/2012 |

OTHER PUBLICATIONS

Extended (Supplementary) European Search Report dated Jun. 17, 2022, issued in counterpart application No. 20822139.0. (11 pages).
Machida et al.; Enantiomer separation of hydrophobic amino compounds by high-performance liquid chromatography using crown ether dynamically coated chiral stationary phase, Journal of Chromatography A, Jan. 15, 1999, pp. 311-320, vol. 830, No. 2, published by Elsevier, Amsterdam, NL, cited in Extended (Supplementary) European Search Report dated Jun. 17, 2022.(10 pages).
Jung, Hee et al., "Liquid Chromatographic Chiral Separations by Crown Ether-Based Chiral Stationary Phases", Journal of Liquid Chromatography & Related Technologies, 2007, vol. 30, pp. 853-875; Cited in IN Office Action dated May 4, 2023. (24 pages).
International Search Report dated Aug. 4, 2020, issued in counterpart Application No. PCT/JP2020/023153. (2 pages).
Notification of Transmittal of Translation of the International Preliminary Report on Patentability (Form PCT/IB/338) issued in counterpart International Application No. PCT/JP2020/023153 mailed Dec. 23, 2021 with Forms PCT/IB/373 and PCT/ISA/237. (5 pages).

*Primary Examiner* — John Kim
(74) *Attorney, Agent, or Firm* — WHDA, LLP

(57) ABSTRACT

Provided is a separation method for amine, the separation method including performing liquid chromatography, wherein a separating agent in which a ligand having a crown ether-like cyclic structure is supported on a carrier is used as a stationary phase, and wherein a mobile phase contains an aqueous solution of at least one salt of a hydrophobic anion selected from the group consisting of a salt of a chaotropic anion and a salt of a hydrophobic organic acid.

13 Claims, 17 Drawing Sheets

AMINE SEPARATION METHOD USING LIQUID CHROMATOGRAPHY

TECHNICAL FIELD

The present disclosure relates to a method for separating amines through liquid chromatography.

BACKGROUND ART

Separating agents having a crown ether-like cyclic structure are widely used as the stationary phase in liquid chromatography to separate compounds having a primary amino group turd similar substances thereof. In particular, it is known that a separating agent in which a own ether-like cyclic structure is bonded to a chiral structure is useful for separating enantiomers.

Patent Document 1 and Patent Document 2 each disclose, as excellent separating agents for optical isomers, a separating agent in which a crown ether-like cyclic structure is bonded to a binaphthyl structure of an S-isomer or an R-isomer. These separating agents are believed to exhibit resolution in the following manner. That is, it is thought that a primary ammonium group ($-NH_3^+$) formed by protonation of a primary amine is enclosed in a crown ether-like cyclic structure through hydrogen bonding between the three hydrogen atoms of the primary ammonium group and the oxygen atoms of the crown ether-like cyclic structure, and thus the primary amine is held in the separating agent, and as a result, separation is possible. Therefore, it is known that when such a stationary phase is used, a strongly acidic mobile phase is suitably used to obtain high resolution. For example, Patent Document 2 discloses a mobile phase made by mixing an aqueous perchloric acid solution or an aqueous trifluoroacetic acid solution with an organic solvent such as methanol or acetonitrile. In this manner, the strongly acidic mobile phase contains a strong acid, and among the strong acids, it is known that perchloric acid most favorably retains amines and improves resolution.

CITATION LIST

Patent Documents

Patent Document 1: JP 02-69472 A
Patent Document 2: WO 2012/050124 A1

SUMMARY OF INVENTION

Technical Problem

However, perchloric acid is not only a strong acid, but also a strong oxidant, which may lead to explosion accidents when handled incorrectly or result in other problems such as corroding metal portions of liquid chromatography equipment. Alternatively, adding other strong acid to the mobile phase in place of perchloric acid results in a problem of failure to ensure the retention force with respect to the amine, and failure to separate the amine favorably.

Thus, an object of the present disclosure is to provide a method in liquid chromatography using a separating agent having a crown ether-like cyclic structure, an amine can be favorably retained and separated without the addition of a large amount of perchloric acid to the mobile phase.

Solution to Problem

As a result of diligent research to solve the above problems, the inventors of the present disclosure discovered that the above problems can be solved by using a solution containing an aqueous solution of a salt of a hydrophobic anion as a mobile phase in liquid chromatography in which a separating agent having a crown ether-like cyclic structure is used. That is, an overview of the present disclosure is as described below.

[1]
A separation method for amine, the separation method comprising: performing liquid chromatography,
wherein a separating agent in which a ligand having a crown ether-like cyclic structure is supported on a carrier is used as a stationary phase, and
wherein a mobile phase comprises an aqueous solution of at least one salt of a hydrophobic anion selected from the group consisting of a salt of a chaotropic anion and a salt of a hydrophobic organic acid.

[2]
The separation method according to [1], wherein the salt of the hydrophobic anion is the salt of the chaotropic anion.

[3]
The separation method according to [2], wherein the chaotropic anion is at least one selected from the group consisting of $PF_6^-$, $BF_4^-$, $ClO_4^-$, $CF_3SO_3^-$, $FSO_3^-$, $(CF_3SO_2)_2N^-$, $PCl_6^-$, $SbCl_6^-$, $CF_3CO_2^-$, $CCl_3CO_2^-$, $NO_3^-$ and $ClO_3^-$.

[4]
The separation method according to [1], wherein the salt of the hydrophobic anion is the salt of the hydrophobic organic acid.

[5]
The separation method according to [4], wherein the hydrophobic organic acid is 8 hydrophobic organic acid including: at least one acid group selected from the mom consisting of sulfate group, a sulfonic acid group and a phosphoric acid pow; and an alkyl group having from 4 to 18 carbons.

[6]
The separation method according to [4] or [5], wherein the hydrophobic organic acid is an alkanesulfonic acid having from 4 to 18 carbons.

The separation method according to any one of [1] to [6], wherein pH of the aqueous solution is from 1.0 to 8.0.

[8]
The separation method according to any one of [1] to [7], wherein the mobile phase comprises an acid other than a hydrophobic organic acid and pen lone acid.

[9]
The separation method according to [8], wherein the acid is formic acid.

[10]
The separation method according to any one of [1] to [9], wherein the amine is a primary amine.

Advantageous Effects of Invention

According to the present disclosure, a method can be prodded in liquid chromatography using a separating agent having a crown ether-like cyclic structure, and an amine can be favorably retained and separated without the addition of a large amount of perchloric acid to the mobile phase.

DESCRIPTION OF EMBODIMENTS

Figure 1:
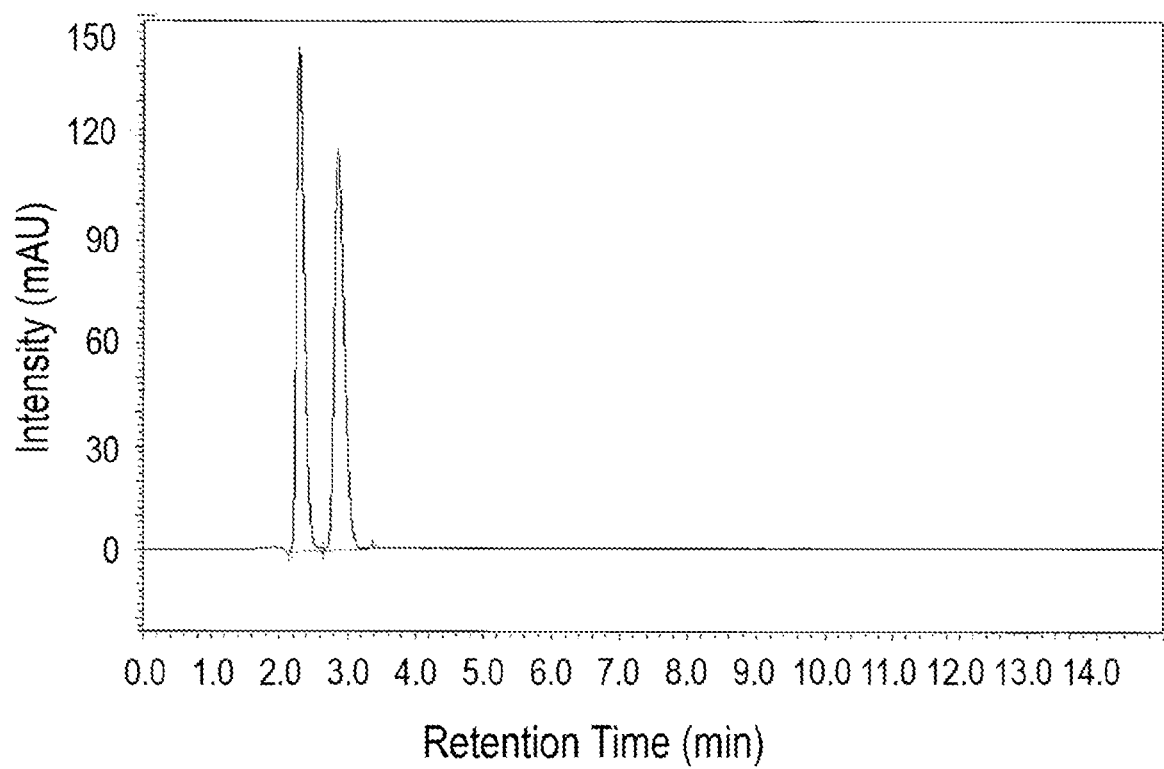
FIG. 1 is a liquid chromatogram of dl-tryptophan in Example 1.

The present disclosure is described in detail below through specific embodiments. However, each of the configurations in each embodiment, combinations thereof and the like are examples, and various additions, omissions, substitutions, and other changes may be made as appropriate within a scope that does not depart from the spirit of the present disclosure. The present disclosure is not limited by the embodiments and is limited only by the claims.

Also, each aspect disclosed in the present specification can be combined with any other feature disclosed herein <1. Separation Method>

A separation method according to one embodiment of the present disclosure is a method of separating an amine through liquid chromatography, using as a stationary phase, a separating agent in which a ligand having a crown ether-like cyclic structure is supported on a carrier, and using as a mobile phase, a solution containing an aqueous solution of at least one salt of a hydrophobic anion selected from the group consisting of a salt of a chaotropic anion and a salt of a hydrophobic organic acid. The separation method according to the present embodiment is not limited as long as separation of the amine is performed by means of liquid chromatography using the stationary and mobile phases described above, and may include, as appropriate, other configurations such as identification and quantification of the separated amines.

<2 Amine>

In the separation method according to the present embodiment, an amine is separated using a squinting agent in which a ligand having a crown ether-like cyclic structure is supported on a carrier as a stationary phase. According to the separation method of alae present embodiment, a mixture of a plurality of amines can be separated into the various amines, and amines can be separated from a mixture containing an amine and a non-amine. When separating a mixture of a plurality of amines, the separation method according to the present embodiment is particularly effective in separating a mixture of amines having mutually similar structures into each amine.

The amine is not particularly limited and may be a primary amine, a secondary amine and/or a tertiary amine. Examples of specific amines include amino acids, such as alanine, cysteine, glutamic acid, methionine, leucine, tyrosine, and tryptophan derivatives such as esters of said amino acids, amino alcohols, such as dimethylaminoethanol, propanolamine, methioninol, and norephedrine; and amino group-containing hydrocarbons, such as phenylethylamine, aniline, methylaniline, and diphenylamine.

The separation method according to the present embodiment is suitable for separating a desired primary amine from a mixture containing a primary amine. This is because the primary amine can be favorably separated by the crown ether-like cyclic structure of the stationary phase.

Furthermore, the separation method according to the present embodiment exhibits a high level of resolution, and therefore can separate a mixture of amines that are difficult to separate due to the structures being mutually similar into each amine. Examples of mixtures of amines in which the structures are mutually similar include mixtures of chain isomers, mixtures of regioisomers, mixtures of geometric isomers, and mixtures of analogs. Further, for a case in which the crown ether-like cyclic structure is an optically active isomer, the separation method according to the present embodiment is effective for separating the mixture of enantiomers into each enantiomer. Specific examples of the separation of these mixtures include the separation of a mixture of aniline analogs including aniline, 2-methylaniline, 3-methylaniline, and 4-methylaniline as indicated in the examples described below; and the separation of tryptophan. The separation method according to the present embodiment is highly useful in that a mixture of enantiomers of compounds containing amino groups can be separated using a ligand having an optically active crown ether-like cyclic structure.

<3. Mobile Phase>

In the present embodiment, the mobile phase used in liquid chromatography contains an aqueous solution of at least one salt of a hydrophobic anion selected from the group consisting of a salt of a chaotropic anions and a salt of a hydrophobic organic acid. Through this configuration, an amine can be retained by the separating agent without addition of perchloric acid to the mobile phase, and the desired amine can be separated.

Components included in the mobile phase are described below, but the mobile phase may contain any component besides these components within a range that does not impair the effects of the present disclosure.

(3-1. Aqueous Solution of a Salt of a Hydrophobic Anion)

The salt of the hydrophobic anion in the present embodiment is at least one salt selected from the group consisting of a salt of a chaotropic anion and a salt of hydrophobic organic acid. That is, in the present embodiment, "hydrophobic anion" Means an anion that is not easily hydrated (i.e. an anion with low hydration energy) such as a chaotropic anion, or a hydrophobic organic acid ion having a hydrophobic organic group snob as an alkyl group. It is speculated that hydrophobic anions exhibit the effect of the present disclosure due to their low hydration energy and high hydrophobicity.

The aqueous solution of a salt of a hydrophobic anion may contain both a salt of a chaotropic anions and a salt of a hydrophobic organic acid, but preferably contains one of these.

(3-1-1. Salt of a Chaotropic Anion)

It is understood that a chaotropic anion is an ion that facilitates the dissolving of organic matter in water by disrupting the aggregate structure of water. Furthermore, it is also understood that a chaotropic anion is an anion ha a small tendency to salt out organic matter in the Hofmeister series. Furthermore, the chaotropic anion itself is an anion having, small hydration energy.

The present inventors speculate that the reason why salts of chaotropic anions contribute to the separation of amines is as follows. That is, it is thought that when the ammonium group formed by protonation of the amino group of the amine, which is a target for separation, is encapsulated by a ligand having a crown ether-like cyclic structure, the chaotropic anion that forms an ion pair with the ammonium group is dehydrated. Furthermore, it is thought that the chaotropic anions with low hydration energy easily dehydrate, and as a result, the ammonium groups are favorably encapsulated, and this encapsulation functions to beneficially retain the ammonium groups.

Examples of specific chaotropic anion include $PF_6^-$ (hexafluorophosphate ions), $BF_4^-$ (tetrafluoroborate ions), $ClO_4^-$ (perchlorate ions), $CF_3SO_3^-$ (trifluoromethanesulfonate ions), $FSO_3^-$ (fluorosulfonate ions), $(CF_3SO_2)_2N^-$ (bis(trifluoromethanesulfonyl)imide ions), $PCl_6^-$ (hexachlorophosphate ions), $SbCl_6^-$ (hexachloroantimonate ions), $CF_3CO_2^-$ (trifluoroacetate ions), $CCl_3CO_2^-$ (trichloroacetate ions). $NO_3^-$ (nitrate ions), and $ClO_3^-$ (chlorate ions). Of these, the chaotropic anion is preferably $PF_6^-$, $BF_4^-$, $ClO_4^-$ and/or $CF_3SO_3^-$, and more preferably $PF_6^-$ and/or $BF_4^-$. This is because the amine retention force can be improved.

A cation forming a salt with the chaotropic anion is not particularly limited as long as the solubility of the salt that is formed is high and the cation does not inhibit separation and detection. This is because the impact of the cation species on retention time and resolution is significantly smaller than that of the chaotropic anions. In other words, with respect to the salt of the chaotropic anion, the ion with higher relevancy to retention time and resolution can be said to be the chaotropic anion rather than the cation. Therefore, the cation that forms the salt with the chaotropic anion may be selected, as appropriate, from well-known cations that form salts with the chaotropic anions described above. Examples of such cations include Group 1 metal ions, such as $Li^+$ (lithium ions), $Na^+$ (sodium ions), $K^+$ (potassium ions), $Rb^+$ (rubidium ions), and $Cs^+$ (cesium ions); Group 2 metal ions, such as $Mg^{2+}$ (magnesium ions), $Ca^{2+}$ (calcium ions), $Si^{2+}$ (strontium ions), and $Ba^{2+}$ (barium ions); and onium ions, such as $NH_4^+$ (ammonium ions). $Me_3HN^+$ (trimethylammonium ions), $Et_3HN^+$ (triethylammonium ions), $Me_4N^+$ (tetramethylammonium ions), $Et_4N^+$ (tetramethylammonium ions), $Bu_4N^+$ (tetrabutylammonium ions), and $Me_3S^+$ (trimethylsulfonium ions). Or these, the cation forming a salt with the chaotropic anion is preferably $NH_4^+$, $Me_4N^+$, $Et_4N^+$, $Bu_4N^+$, $Li^+$, $Na^+$, $K^+$, $Mg^{2+}$ and/or $Ca^{2+}$, and is more preferably $NH_4^+$, $Me_4N^+$, $Et_4N^+$, $Bu_4N^+$, $Li^+$, $Na^+$ and/or $K^+$. Furthermore, from the perspectives of availability and analytical resolution, the cation forming a salt with the chaotropic anion is even more preferably $Na^+$.

Specific examples of the salt of the chaotropic anion include lithium perchlorate, sodium perchlorate, ammonium perchlorate, tetramethylammonium perchlorate, hexafluorophosphate, sodium hexafluorophosphate, potassium hexafluorophosphate, lithium tetrafluoroborate, sodium tetrafluorborate, and potassium tetrafluoroborate. Among these, the salt of the chaotropic anion is preferably lithium, perchlorate, sodium perchlorate, ammonium perchlorate tetramethylammonium perchlorate, sodium hexafluorophosphate, potassium hexafluorophosphate, ammonium trifluoroacetate, and/or sodium tetrafluoroborate, and is more preferably sodium perchlorate, ammonium perchlorate, tetramethylammonium perchlorate, sodium hexafluorophosphate and/or potassium hexafluorophosphate. This is because the amine retention force can be improved.

Note that the salt of the chaotropic anion contained in the mobile phase of the present embodiment may be one or more types.

The concentration of the chaotropic anion in the aqueous solution of the salt of the chaotropic anion is not particularly limited, but is ordinarily 1 mM or greater, preferably 5 mM or greater, more preferably 8 mM or greater, and even more preferably 10 mM or greater, and is normally 200 mM or smaller, preferably 150 mM or smaller, more preferably 100 mM or smaller, even more preferably 50 mM or smaller, and particularly preferably 40 mM or smaller. While depending on the type of chaotropic anion, when the concentration of the chaotropic anion is too high, amine retention may weaken, but when the concentration thereof is within the range described above, amines can be favorably retained. However, depending on the type of cation that forms the salt with the chaotropic anion the amine retention force can be ensured even. When the concentration of the chaotropic anion is higher than the concentration range described above. Examples of such canons include quaternary ammonium ions and sulfonium ions.

Note that depending on the type, the chaotropic anion may produce a difference in effects such as retention time and separation performance. When a chaotropic anion having a relatively low effect is adopted, the effect can be increased by increasing, the concentration in the aqueous solution. As is clear from the above concentration ranges, there is no need to use the chaotropic anion at a high concentration, and thus the chaotropic anion is economically advantageous in that degradation of the liquid chromatography instrument can be inhibited, and the instrument can be used over a long period of time.

(3-1-2. Salt of a Hydrophobic Organic Acid)

The present inventors speculate that the reason why the salt of the hydrophobic organic acid ion contributes to the separation of amines is as follows. That is, it is thought that when the ammonium group formed by protonation of the amino group of the amine, which is A target for separation, is encapsulated by a ligand having a crown ether-like cyclic structure, the hydrophobic organic acid ion that forms an ion pair with the ammonium group dehydrated at some stage. Furthermore, it is thought that hydrophobic organic acid ions having low hydration energy perhaps due to the impact of the hydrophobic group easily dehydrate- and as a result the ammonium groups are stably encapsulated, and this encapsulation functions to beneficially retain the ammonium groups.

The hydrophobic organic acid is not particularly limited as long as it has an acid group and a hydrophobic organic group.

Examples of the acid group include a sulfonic acid group ($-SO_3H$), a sulfate group ($-OSO_3H$), a phosphoric acid group ($-OP(O)(OH)_2$), and a phosphonic acid group ($-P$ (O)(OH)$_2$). The acid pow is preferably a sulfonic acid group and/or a sulfite soup, and is more preferably a sulfonic acid group.

The number of acid groups in the hydrophobic organic acid may be one or more. When the hydrophobic organic acid has two or more acid groups, the plurality of acid groups may be mutually the same or different, but are preferably the same.

Examples of the hydrophobic organic group the present embodiment include alkyl groups having from 4 to 18 carbons (hereinafter, also referred to simply as an "alkyl group" or an "alkyl"). The alkyl group may be a linear alkyl group, a branched alkyl group, or a cyclic alkyl group. For the alkyl group having from 4 to 18 carbons, the retention force with respect to an amine increases as the alkyl chain becomes longer. Therefore, the alkyl group may be appropriately selected according to the desired retention time and ease of separation of the sample. The number of cares inure alkyl group is preferably 6 or more, more preferably 8 or more, and even more preferably 10 or more, and is preferably 16 or less, and more preferably 14 or less. When the number of carbons in the group is within such a range, there are various advantages such as, a sufficiently long amine retention time, well-resolved peaks in the liquid chromatogram, suppressed formation of foaming in the mobile phase during de-aeration of the mobile phase, and good dissolution of the hydrophobic organic acid in water or a solvent with low organic solvent content. Note that the alkyl pow having from 4 to 18 carbon atoms may be unsubstituted, or substituted with a halogen atom such as a fluorine atom, a chlorine atom, a bromine atoms, or an iodine atom.

The number of alkyl groups having film 4 to 18 carbons of the hydrophobic organic acid may be one or more. When the hydrophobic organic acid has two or more groups having from 4 to 18 carbons, the plurality of alkyl groups may be mutually the same or different and the aforementioned number of carbons refers to the number of carbons of one alkyl group.

Examples of the above-described hydrophobic organic acid having the acid group and the hydrophobic organic group include alkanesulfonic acids, alkyl sulfates, alkyl phosphates, and alkyl phosphoric acids.

Examples of alkanesulfonic acids include butanesulfonic acid, pentanesulfonic acid, hexanesulfonic acid, heptanesulfonic acid, octanesulfonic acid, nonanesulfonic acid, decanesulfonic acid, undecanesulfonic acid, dodecanesulfonic acid, tridecanesulfonic acid, tetradecanesulfonic acid, pentadecanesulfonic acid hexadecanesulfonic acid, heptadecanesulfonic acid, and octadecanesulfonic acid. Of these, the alkanesulfonic acid is preferably hexanesulfonic acid, heptanesulfonic acid, octanesulfonic acid, nonanesulfonic acid, and/or decanesulfonic acid.

Examples of alkyl sulfates include butyl sulfate, pentyl sulfate, hexyl sulfate, heptyl sulfate, octyl sulfate, non-A sulfate, decyl sulfite, undecyl sulfate, dodecyl, sulfate, tridecyl sulfate, tetradecyl sulfite, pentadecyl sulfate, hexadecyl, sulfate, heptadecyl sulfate, and octadecyl sulfate.

Examples of alkyl phosphates include monobutyl phosphate, dibutyl phosphate, monopentyl phosphate, dipentyl phosphate, monohexyl phosphate, dihexyl phosphate, monopentyl phosphate, diheptyl phosphate, monooctyl phosphate, dioctyl phosphate, mononoyl phosphate, dinonyl phosphate, monodecyl phosphate, didecyl phosphate, monoundecyl phosphate, diundecyl phosphate, monododecyl phosphate, didodecyl phosphate, monotridecyl phosphate, ditridecyl phosphate, monotetradecyl phosphate, ditetradecyl phosphate, monopentadecyl phosphate, dipentadecyl phosphate, monohexadecyl phosphate, dihexadecyl phosphate, monoheptadecyl phosphate, diheptadecyl phosphate, monooctadecyl phosphate, and dioctadecyl phosphate.

Examples of alkylphosphonic acids include butylphosphonic acid pentylphosphonic acid, hexylphosphonic acid, heptylphosphonic acid, octylphosphonic acid nonylphosphonic acid, decylphosphonic acid, undecylphosphonic acid, dodecylphosphonic acid, tridecylphosphonic acid, tetradecylphosphonic acid, pentadecylphosphonic acid, hexadecylphosphonic acid, heptadecylphosphonic acid, and octadecylphosphonic acid.

In the present embodiment the hydrophobic organic acid is preferably an alkanesulfonic acid and/or an alkyl sulfate, and is more preferably an alkanesulfonic acid.

Note that the hydrophobic organic acid may consist of only the acid group and the hydrophobic organic group, but may also have groups such as other atomic groups that do not adversely affect the detection of components in liquid chromotography, such as, for example, an aromatic hydrocarbon group such as a phenyl group and a naphthyl group; and an alkenyl group such as a dodecenyl group and an oleyl group.

For the same reasons as described in the explanation of the cation that forms the salt with the chaotropic anion the cation forming a salt with the hydrophobic organic acid is not particularly limited as long as the solubility of the salt that is filmed is and the cation does not inhibit separation and detection. Examples of such cations include cations similar to the cations that form a salt with the chaotropic anion. The cation that forms the salt with the hydrophobic organic acid is preferably a Group 1 metal ion, such as Li$^+$, Na$^+$, K$^+$, Rb$^+$, and Cs$^+$, and is more preferably Li$^+$, Na$^+$, and/or K$^+$. Furthermore, from the perspectives of availability and analytical resolution, the cation forming a salt with the hydrophobic organic acid is even more preferably Na$^+$.

The salt of the hydrophobic organic acid is preferably sodium butane sulfonate, sodium pentane sulfonate, sodium hexane sulfonate, sodium heptane sulfonate, sodium octane sulfonate, sodium nonan sulfonate, sodium decane sulfonate, sodium undecane sulfonate, sodium dodecane sulfonate, sodium tridecane sulfonate, sodium tetradecane sulfonate, sodium pentadecane sulfonate, sodium hexadecane sulfate, sodium heptadecane sulfate, sodium octadecane sulfonate, sodium butyl sulfite, sodium pentyl sulfate, sodium hexyl sulfate, sodium heptyl sulfate, sodium octyl sulfate, sodium nonyl sulfate, sodium decyl sulfate, sodium undecyl sulfate, sodium dodecyl sulfate, sodium tridecyl sulfate, sodium tetradecyl sulfite, sodium pentadecyl sulfate, sodium hexadecyl sulfate, sodium heptadecyl sulfate and/or sodium octadecyl sulfate, and is more preferably sodium hexane sulfonate, sodium heptane sulfonate, sodium octane sulfonate, sodium nonane sulfonate, sodium decane sulfonate, sodium undecane sulfonate, sodium dodecane sulfonate, sodium tridecane sulfonate, sodium tetradecane sulfonate, sodium pentadecane sulfonate, sodium hexadecane sulfonate, sodium heptadecane sulfonate and/or sodium octadecane sulfonate, and is more preferably sodium hexane sulfonate, sodium octane sulfonate, and/or sodium decane sulfonate.

Note that the salt of the hydrophobic organic acid contained in the mobile phase of the present embodiment may be once or more types.

The concentration of the hydrophobic organic acid ions in the aqueous solution of the salt of the hydrophobic organic acid is not particularly limited, but kw a case in which the hydrophobic organic acid has one acid group, the concentration of the hydrophobic organic acid ions is ordinarily 1 mM or greater, preferably 5 mM or greater, more preferably 8 mM or greater, and even more preferably 10 mM or greater, and is normally 200 mM or smaller, preferably 150 mM or smaller, more preferably 100 mM or smaller, even more preferably 50 mM or smaller, and particularly preferably 40 mM or smaller. Note that when the hydrophobic organic acid has two or more acid groups, the typical concentration and preferred concentration of the hydrophobic organic acid ions is a value obtained by dividing the concentration described above by the number of acid groups.

As described above, the hydrophobic organic acid is a hydrophobic organic acid having mainly an alkyl group, and the effect of enhancing retention even at the same molar concentration generally increases as the number of carbon atoms in the alkyl group increases. However, when the number of carbons is large, micelles can easily be formal at high concentrations, and the amine retention force may decrease. Therefore, the amine can be favorably retained when the concentration of the hydrophobic organic acid ions in the aqueous solution of the salt of the hydrophobic organic acid is within the range described above.

The hydrophobic organic acid ions produce a difference in effects such as the retention time and separation performance depending on the tree and particularly the number of carbons of the alkyl group (length of the alkyl chain). When a salt of a hydrophobic organic acid is used, if concentrations are the same, the retention intensity correlates with the number of carbons. Therefore the use of a salt is advantageous in that the type of hydrophobic organic acid can be easily selected. When hydrophobic organic acid ions having a relatively low effect are adopted, the effect can be increased by increasing the concentration in the aqueous solution. As is clear from the above concentration ranges, the hydrophobic organic acid ions is not necessarily at a high concentration, and thus the hydrophobic organic acid ions are economically advantageous in that degradation of the liquid chromatography instrument can be inhibited, and the instrument can be used over a, long period of time.

(3-2. pH of Aqueous Solation of a Salt of a Hydrophobic Anion)

The effects of pH on retention time and resolution include the protonation of amino groups. The ease of protonation of an amine differs depending on the structure and functional groups of the amine, and therefore the pH required for protonation also differs. As such, the pH values suited for the retention time and resolution of various amines also differ.

For example, if an aliphatic amine that does not have an acid group such as a carboxyl group is to be separated, the amino group can be protonated even under neutral to weakly acidic conditions. Therefore, favorable separation is possible under relatively high pH conditions of neutral to weakly acidic. In this case, there is an advantage in that corrosion of the chromatography instrument is suppressed, and long-term use of the instrument is possible. Aromatic amines are less basic and not as easily protonated in comparison to aliphatic amines. Therefore, in general, aromatic amines are preferably separated at a slightly lower pH than aliphatic amines (details are described below). Note that when the mobile phase contains an organic solvent described below in addition to the aqueous solution of a salt of a hydrophobic anion, the pH of the mobile phase becomes closer to neutral compared to a case in which an organic solvent is not contained, and separation occurs under a milder condition.

Furthermore, when, for example, an amino acid is to be separated, favorable separation is easily achieved by suppressing the dissociation (ionization) of the carboxyl wow under relatively low pH conditions of weakly acidic to strongly acidic.

Note that in the present specification, "neutral to weakly acidic" means that the pH (at 25° C.) is from 2.0 to 8.0. Furthermore, "weakly acidic to strongly acidic" means that the pH is from 1.0 to 4.0.

The pH of the aqueous solution of the salt of the hydrophobic anion included in the mobile phase depends on factors snob as the structure and/or functional group of the amine, the type and amount of the organic solvent described below, and the sample containing the amine. However, the pH thereof is usually 8.0 or lower, preferably 6.0 or lower, and more preferably 40 or lower, and is usually 1.0 or higher, preferably 2.0 or higher, more preferably 2.5 or higher, and even more preferably 3.0 or higher.

Note that the pH of the aqueous solution of the salt of the hydrophobic anion can be adjusted by adding an acid described below to the mobile phase.

As noted above, the pH required far protonation differs depending on the structure and/or functional group of the amine. Hereinafter, a case in which a suitable pH range of the aqueous solution of the salt of the hydrophobic anion is varied thin 1.0 to 8.0 depending on the type of amine is described with specific examples.

For example, when the amine is an aromatic amine (an amine in which the amino group is bonded to an aromatic carbon atom), the pH of the aqueous solution of the salt of the hydrophobic anion is preferably slightly low because the aromatic amine is a weak base and is less likely to be protonated. The specific pH of the aqueous solution of the salt of the hydrophobic anion used in the separation of an aromatic amine may be 6.0 or lower, 5.0 or lower, 4.0 or lower, 3.5 or lower, or 3.0 or lower, and may be 1.0 or higher, 2.0 or higher, or 2.5 or higher. While depending on the functional group of the aromatic amine, the pH of the aqueous solution of the salt of the hydrophobic anion is preferably not water than 4.0.

On the other hand, when the amine is an aliphatic amine (an amine in which the amino group is bonded to an aliphatic carbon atom), protonation occurs more easily compared to the ease of an aromatic amine. Therefore, even when the pH of the aqueous solution of the salt of the hydrophobic anion is approximately the same or higher than the pH in the case of an aromatic amine, protonation proceeds, making the separation possible. Therefore, the specific pH of the aqueous solution of the salt of the hydrophobic anion used in the separation of the aliphatic amine may be 8.0 or lower, 7.0 or lower, 60 or lower, or 5.0 or lower, and may be 1.0 or higher, 2.0 or higher, 2.5 or higher, 3.0 or higher, or 3.5 or higher.

Also, when the amines are various enantiomers of an amino acid having a carboxyl group as a functional group besides an amino plum, the specific pH of the aqueous solution of the salt of the hydrophobic anion used in the separation of the enantiomers of the amino acid may be 4.0 or lower, 3.5 or lower, 3.0 or lower, 2.6° dower or less than 2.0, and may be 1.0 or higher, 1.5 or hi her, or 1.8 or higher. The suppression of the carboxyl group dissociation tends to improve the resolution. The it is preferable that the pH of the aqueous solution of the salt of the hydrophobic anion be a lower value than that of the aliphatic amine and aromatic amine without a carboxyl group described above. More specifically, the pH of the aqueous solution of the salt of the hydrophobic anion is preferably 3.0 or lower, more preferably 2.6 or lower, and even more preferably less than 2.0, and is preferably 1.0 or higher, and more preferably 1.5 or higher.

(3-3. Acid)

Properties (in particular, the degree of basicity) of the amino group of the sample, the functional groups other than the amino group, the impurities, the amount of sample subjected to separation, and other such factors may affect amine retention. In such a case, the pH can be adjusted to the pH described above by adding an additional acid in the aqueous solution of the salt of the hydrophobic anion.

For example, when an amine not having an acid soup such as a carboxyl group is to be separated, the amino group can be protonated under neutral to weakly acidic conditions. Therefore favorable separation is possible without adding an acid to the aqueous solution of the salt of the hydrophobic anion, or even with the addition of a weak acid.

Also, for example, when an amino acid or an enantiomer thereof is to be separated, it is desirable to suppress the carboxyl group dissociation, and therefore favorable separation is possible under weakly acidic to strongly acidic conditions. In such a curse, the pH may be adjusted by adding a strong acid to the aqueous solution of the salt of the hydrophobic anion.

Note that in the present specification, the mention of simply an "acid," a "strong acid," or an "organic aid" refers to the acid described this section rather than the hydrophobic organic acid.

The acid thereof is an acid than the hydrophobic organic acid and perchloric acid described above and is not particularly limited as long as the acid does not inhibit separation, and one or more types of acids can be selected, as appropriate, from organic acids and inorganic acids.

Examples of the organic acid include formic acid, acetic acid, propionic acid, butyric acid, oxalic acid, malonic acid, succinic acid, glutaric acid, adipic acid, lactic acid and various sulfonic acids having three or fewer carbons. Examples of the inorganic acid include hydrochloric acid, sulfuric acid, nitric acid, and phosphoric acid. Of these, the acid is preferably hydrochloric acid, sulfuric acid, nitric acid, phosphoric acid, formic acid, acetic acid, and/or various sulfonic acids having three or fewer carbons. When the aqueous solution of the salt of a hydrophobic anion is to be adjusted range of from weakly acidic to strongly acidic, the acid is preferably hydrochloric acid, sulfuric acid, nitric acid, phosphoric acid, and/or various sulfonic acids having three or fewer carbons. Also, when the aqueous solution of a salt of a hydrophobic anion is to be adjusted to a range of from neutral to weakly acidic, the acid is preferably formic acid. These acids are easier to handle compared to perchloric acid.

When a mobile phase having a pH of 1.0 or higher and containing only the acid described above as a component other than the solvent without containing a salt of a hydrophobic anion, as shown by Comparative Example 2 described below, is used, the amine retention time is short, and favorable separation cannot be achieved. In contrast, when a mobile phase according to the present embodiment in which a salt of a hydrophobic anion coexists with the acid described above is used, as demonstrated by the examples described below, an amine can be favorably retained and separated. In addition, since it is not necessary to add a large amount of perchloric acid, the mobile phase can be easily prepared and handled, and corrosion of the instrument can be reduced.

Note that the description above is not intended to indicate that the mobile phase of the present embodiment contains absolutely no perchloric acid, and the present embodiment may be an aspect in which the mobile phase contains perchloric acid.

(3-4. Organic Solvent)

The mobile phase may also include an organic solvent in addition to the aqueous solution of the salt of the hydrophobic anion, or may not include an organic solvent. A case in which the mobile phase does not contain an organic solvent is preferable because of merits including the ability to easily obtain a long retention time and appropriate resolution. In addition a case in which the mobile phase contains an organic solvent is preferable from merits such as the amine retention time not becoming overly long, and the peak of the liquid chromatogram easily well-resolved.

The content and type of the organic solvent in the mobile phase are not particularly limited as long as the compatibility with the aqueous solution of a salt of a hydrophobic anion is good, and the salt of the hydrophobic anion and the sample can be dissolved at the required concentrations. Furthermore, one or more types of organic solvents can be selected, as appropriate, from various organic solvents according to the subject to be separated, the retention intensity, the desired peak shape, and the like.

Examples of such organic solvents include alcohols such as methanol, ethanol, n-propanol, and 2-propanol; ethers such as tetrahydrofuran and 1,2-dimethoxyethane; ketones such as acetone and methyl ethyl ketone; nitriles such as acetonitrile, propionitrile, and benzonitrile; and solvents with relatively high polarity such as DMSO, sulfolane, HMPA, DMF, DMAC, NMP, and formamide. These organic solvents are not limited to one type, and may be a mixed organic solvent in which two or more types are combined.

In the present embodiment, the organic solvent is preferably methanol, ethanol, n-propanol, 2-propanol, tetrahydrofuran, acetone, methyl ethyl ketone, methyl isobutyl ketone, or acetonitrile. These organic solvents are preferable because of the high solubility of salts of hydrophobic anions therein. In the present embodiment, the organic solvent is also preferably methanol or acetonitrile. This is because these organic solvents can suppress an increase in column pressure due to the low viscosity and are suitable for UV detection because they have substantially no UV absorption.

The mixing ratio of the aqueous solution containing the salt of the hydrophobic anion and the aid if necessary to the organic solvent is not particularly limited as long as the solubility of the salt of the hydrophobic anion and the sample and the compatibility between the aqueous solution and die organic solvent are good and there are no adverse effects on detection. Accordingly, a ratio suitable for improving the retention time and the resolution may be selected in a volume ratio range of the aqueous solution to the organic solvent of from 5:95 to 100:0.

(3-5. Preparation of the Mobile Phase)

The mobile phase can be prepared by mixing the salt of the hydrophobic anion, water, the organic solvent, and, as necessary, the acid. The cider of mixing is not particularly limited, but if the mobile phase contains the optic solvent, in order to have the salt of the hydrophobic anion be pert in a state of being dissolved in the mobile phase, it is preferable to prepare the aqueous solution in advance by dissolving the salt of the hydrophobic anion in water, and then mix the aqueous solution with the organic solvent to prepare the mobile phase.

<4. Stationary Phase>

The stationary phase of the present embodiment is a separating agent in which a ligand having a crown ether-like cyclic structure is supported an a carrier.

(4-1. Ligand)

In the present specification, ligand means a compound that is supported on a carrier and exhibits physical affinity for the separation target and, as necessary, a anal recognition ability. The ligand of the present embodiment has a crown ether-like cyclic structure. That is, the ligand is a compound in which a crown ether backbone represented by Formula (I) is chemically bonded to an aliphatic, alicylic or aromatic hydrocarbon to form a macrocyclic polyether structure.

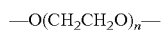   (I)

In the formula, n can be selected, as appropriate, from integers of 4 to 6 according to the hydrocarbon to which the amino group of the amine and the crown ether backbone are banded. For example, a ligand represented by Formula (II) or (III) described below is suitably used to separate primary amines because n is 5, and his the ligand has a crown ether-like cyclic structure of a size suitable for enclosing a primary ammonium group.

Furthermore, the hydrogen atom of the ethylene group in the ring unit may be substituted by various functional groups, but is preferably unsubstituted.

In the present embodiment, when enantiomers are to be separated, a compound in which the mown ether-like cyclic structure is bonded to a homochiral structure is used as the ligand. Examples of such ligands include ligands represented by Formula (II) des abed in JP 2-69472 A and WO 2012/050124, and ligands represented by Formula (III) described in JP 2014-169259 A. In addition, ligands for which the phenyl groups at the 3 and 3' positions of the 1,1'-binapthyl structure in Formula (II) are substituted with halogen atoms such as bromine atoms, alkyl groups such as methyl groups, substituted aromatic groups, heterocyclic groups, or the like (Peng Wu, et al., Chin. J. Chem., 2017, 35, 1037-1042) may also be used.

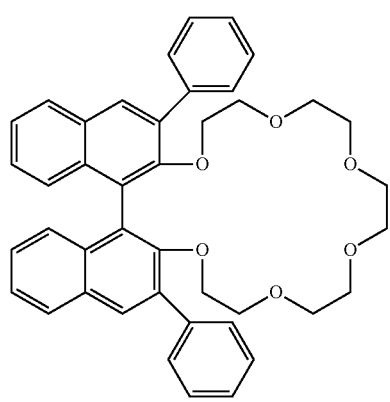

(II)

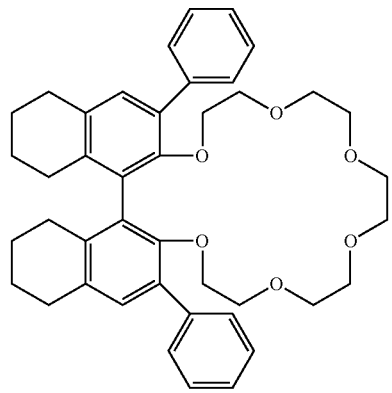

(III)

The ligand is used as a separating agent in a state of being supported by a carrier. A known aspect may be adopted as the mode of supporting the ligand on the carrier, and tbt example, an aspect in which the ligand is supported on the carrier by chemical bonding, such as covalent bonding, can be suitably adopted. An example of a specific support method is a method in which a reactive group is introduced into the ligand, the ligand raw material, or a ligand intermediate, and this substituent is reacted with a reactive group present on the carrier surface. Note that the reactive group present on the surface of the carrier may be a group present on the surface of the untreated carrier, or may be a group introduced to the surface of the carrier through a surface treatment thing a silane coupling agent such as, for example, 3-aminopropyl triethoxysilane or 3-glycidyloxypropyl trimethoxysilane.

(4-2. Carrier)

The carrier is not particularly limited as long as the ligand can be fixed to the carrier by chemical bonding, such as covalent bonding. Such a carrier may be an inorganic carrier or an organic carrier, but is preferably an inorganic carrier. Examples of inorganic carriers include silica, alumina, magnesia, glass, kaolin, titanium oxide, silicate and hydroxyapatite. Examples of organic carriers include polystyrene, polyacrylamide, polyacrylate, and polysaccharide. These organic carriers are preferably insolubilized by crosslinking using a crosslinking agent.

The form of the carrier is not particularly limited, and examples thereof include particles and porous cylindrical bodies (monoliths) that are housed in a column tube with a liquid tight seal. Another example of the carrier is an inner wall of a capillary.

In the present embodiment, from the perspective of improving the resolution, the carrier is preferably a porous body, and is more preferably a porous body having a BET specific surface area from 100 to 600 m$^2$/g. In addition, from the perspective of improving resolution, the porous body preferably has a pore diameter of from 60 to 300 Å, as measured by mercury intrusion porosimetry.

In the present embodiment, the carrier is preferably a silica gel. This is because silica gel excels in the property described above, namely, resolution, and is also hard and strong. In addition to a silica gel that is entirely porous, a so-called core-shell type silica gel may also be used as the silica gel.

EXAMPLES

Hereinafter, the present disclosure will be described more specifically with reference to examples, but the present disclosure is not limited to the following examples as long as there is not deviation from the gist of the present disclosure.

Example 1: Separation of Dl-Tryptophan

An aqueous solution of a salt of a chaotropic anion was prepared by dissolving 0.15 g of 88% frantic acid in 100 mL of a 20 mmol/L lithium perchlorate solution. A mobile phase A was then prepared by mixing the obtained aqueous solution of the salt of the chaotropic anion and acetonitrile at a volume ratio of 70:30. The composition of the mobile phase A and the pH (at 25° C.) of the aqueous solution of the salt of the chaotropic anion are shown in Table 1. The pH was measured using a pH meter (available from Horiba, Ltd.). The same applies to the examples below.

Next, a column (CROWNPAK CR-I-(-); available from Daicel Corporation; inner diameter of 3 mm; length of 150 mml packed with a separating agent in which a ligand having a crown ether-like structure represented by Formula (IV) below was supported by silica gel was attached to a liquid chromatography instrument (LC7 High Speed Liquid Chromatograph, available from Shimadzu Corporation).

The sample was then separated by the liquid chromatograph using the mobile phase A under the separation conditions described below. At that time, peaks were detected and identified by a UV detector at a wavelength of 254 nm.

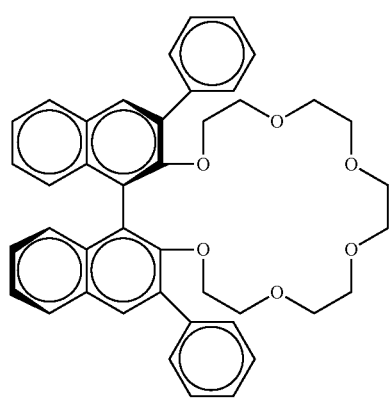

(IV)

(Separation Conditions)
Sample: 0.1 mg/mL dl-tryptophan aqueous solution; 1.0 μL
Flow rate: 0.43 mL/min
Temperature: 30° C.

The obtained chromatogram is shown in FIG. 1. In FIG. 1, peaks attributed, to l-tryptophan and d-tryptophan were observed near retention times of 2.1 min and 2.9 min, respectively.

Comparative Example 1: Separation of Dl-Tryptophan

A mobile phase B was prepared by mixing a 20 mmol/L perchloric acid aqueous solution and acetonitrile at a volume ratio of 70:30. The composition of the mobile phase B and the pH of the perchloric acid aqueous solution (at 25° C.) are shown in Table 1.

A sample was separated in the same manner as in Example 1 with the exception that the mobile phase B was used as the mobile phase.

Figure 2:
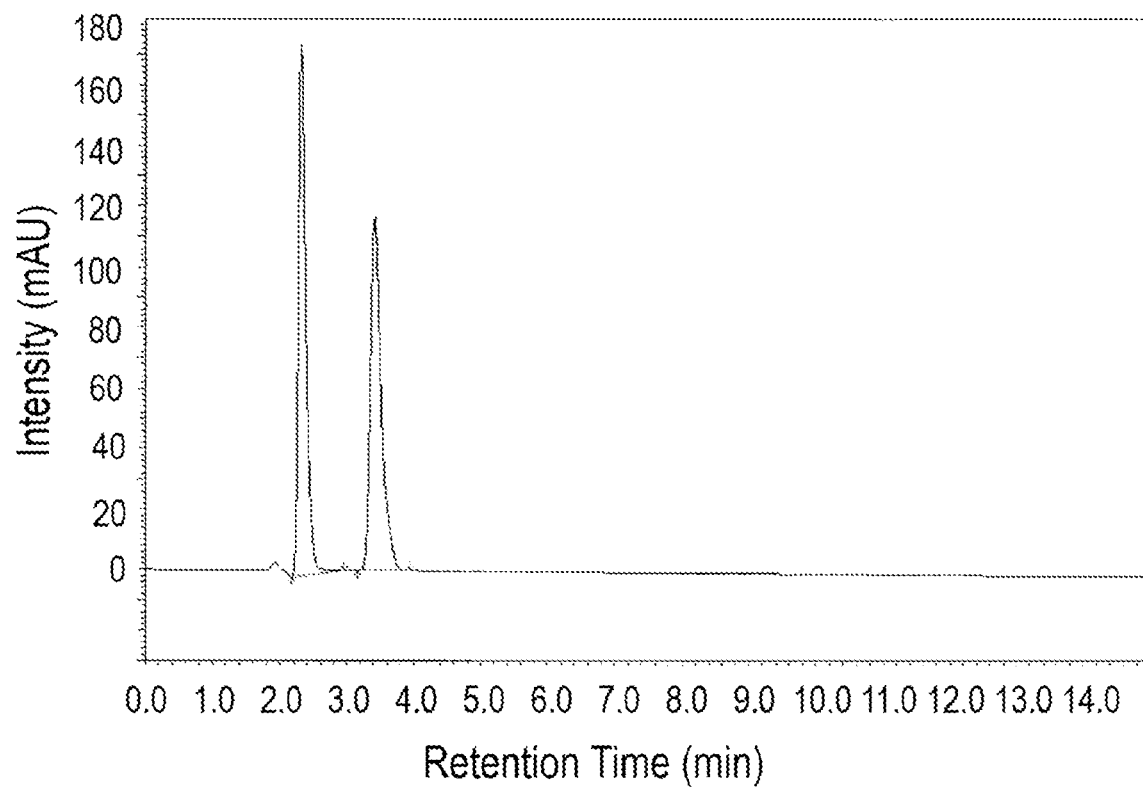
FIG. 2 is a liquid chromatogram of dl-tryptophan in Comparative Example 1.

The obtained chromatogram is shown in FIG. 2. In FIG. 2, peaks attributed to l-tryptophan and d-tryptophan were observed near retention times of 2.3 min and 3.4 min, respectively.

Comparative Example 2: Separation of Dl-Tryptophan

A formic acid aqueous solution was prepared by dissolving 1.31 g of formic acid in 1 L of water. A mobile phase C was prepared by mixing the obtained formic acid aqueous solution and acetonitrile at a volume ratio of 70:30. The composition of the mobile phase C and the pH of the formic acid aqueous solution (at 25° C.) are shown in Table 1.

A sample was separated in the same manner as in Example 1 with the exception that the mobile phase C was used as the mobile phase.

Figure 3:
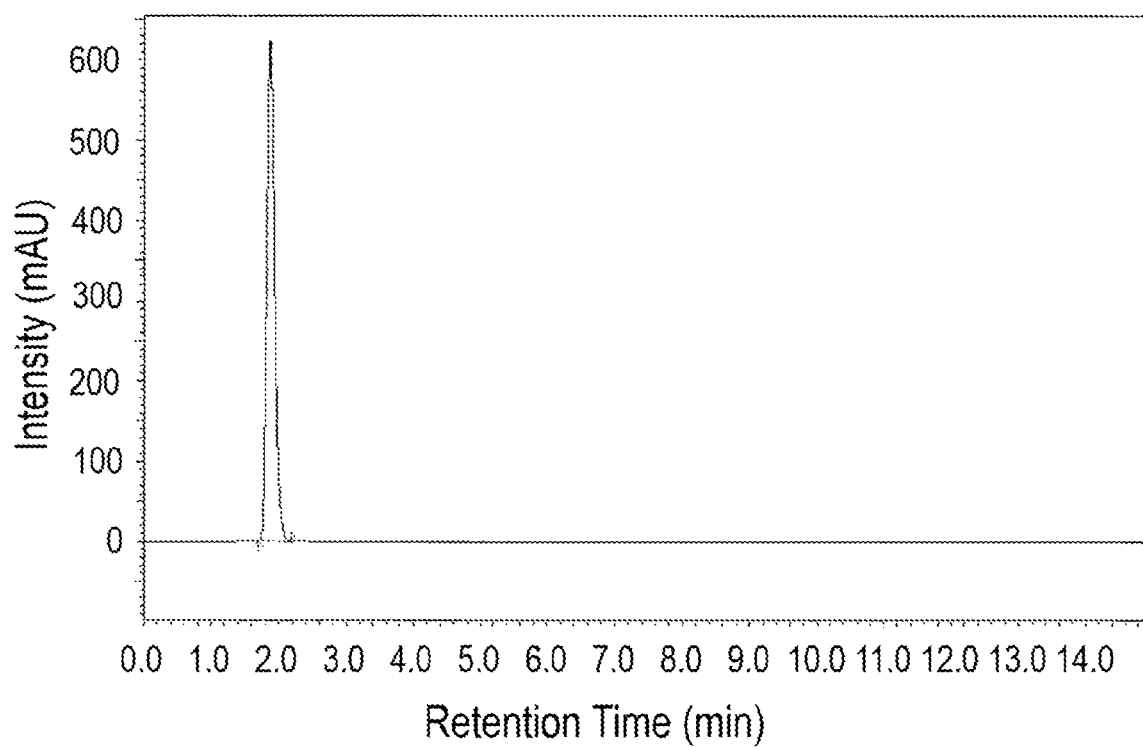
FIG. 3 is a liquid chromatogram of dl-tryptophan in Comparative Example 2.

The obtained chromatogram is shown in FIG. 3. In FIG. 3, a peak attributed to dl-tryptophan (enantiomer mixture) was observed near a retention time of 1.9 min.

Comparative Example 1 is an example in an related art, in which a mobile phase containing a perchloric acid aqueous solution having a pH of 1.79 was used. From Comparative Example 1, it was confirmed that the dl-tryptophan was separated into each enantiomer.

Comparative Example 2 is an experimental example in which a mobile phase containing a formic acid aqueous solution at the same concentration as the perchloric acid aqueous solution of Comparative Example 1 was used. It was found that even though a mobile phase containing a formic acid aqueous solution having a pH of 2.64 and not containing a salt of a chaotropic anion was used, the dl-tryptophan could not be separated into each enantiomer.

On the other hand, in Example 1, in which a mobile phase containing a lithium perchlorate-containing aqueous solution having a pH of 2.60 was used in addition to formic acid at the same concentration as Comparative Example 2, it was confirmed that the dl-tryptophan was separated into each enantiomer. That is, Example 1 demonstrated that the salt of the chaotropic anions contained in the mobile phase contributes to good separation.

Example 2: Separation of Aniline Analog Mixture

A mobile phase D was prepared by mixing a 20 mmol/L aqueous solution of potassium hexafluorophosphate, which was an aqueous solution of a salt of a chaotropic anion, and acetonitrile at a volume ratio of 70:30. The composition of the mobile phase D and the pH (at 25° C.) of the aqueous solution of the salt of the chaotropic anion are shown in Table 1.

A sample was separated in the same manner as in Example 1 with the exception that the mobile phase D was used as the mobile phase, and 1 μL of a mixture of aniline, 2-methylaniline, 3-methylaniline, and 4-methylaniline (a sample prepared by mixing a 1 μL aqueous solution of each compound and a 1M aqueous hydrochloric acid solution at equal amounts each) was used as the sample.

Figure 4:
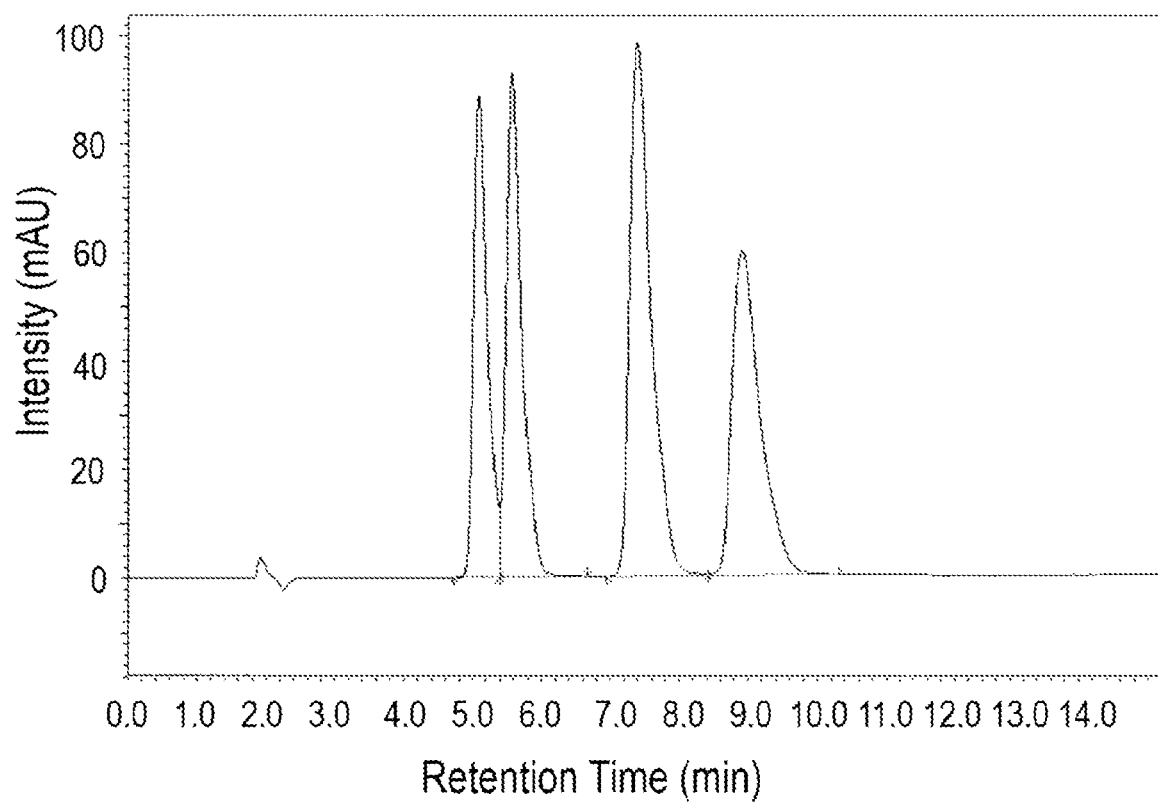
FIG. 4 is a liquid chromatogram of an aniline analog mixture in Example 2.

The obtained chromatogram is shown in FIG. 4. In FIG. 4, peaks attributed to aniline, 2-methylaniline, 3-methylaniline and 4-methylaniline were observed near retention times of 5.1 mm 5.5 min, 7.4 min and 8.9 min, respectively.

Example 3: Separation of Aniline Analog Mixture

An aqueous solution of a salt of a chaotropic anion was prepared by dissolving 1.31 g of formic acid in 1 L of a 20 mmol/L potassium hexafluorphosphate aqueous solution. A mobile phase E was then prepared by mixing the obtained aqueous solution of the salt of the chaotropic anion and acetonitrile at a volume ratio of 70:30. The composition of the mobile phase E and the pH (at 25° C.) of the aqueous solution of the salt of the chaotropic anion are shown in Table 1.

A sample was separated in the same manner as in Example 2 with the exception that the mobile phase E was used as the mobile phase.

Figure 5:
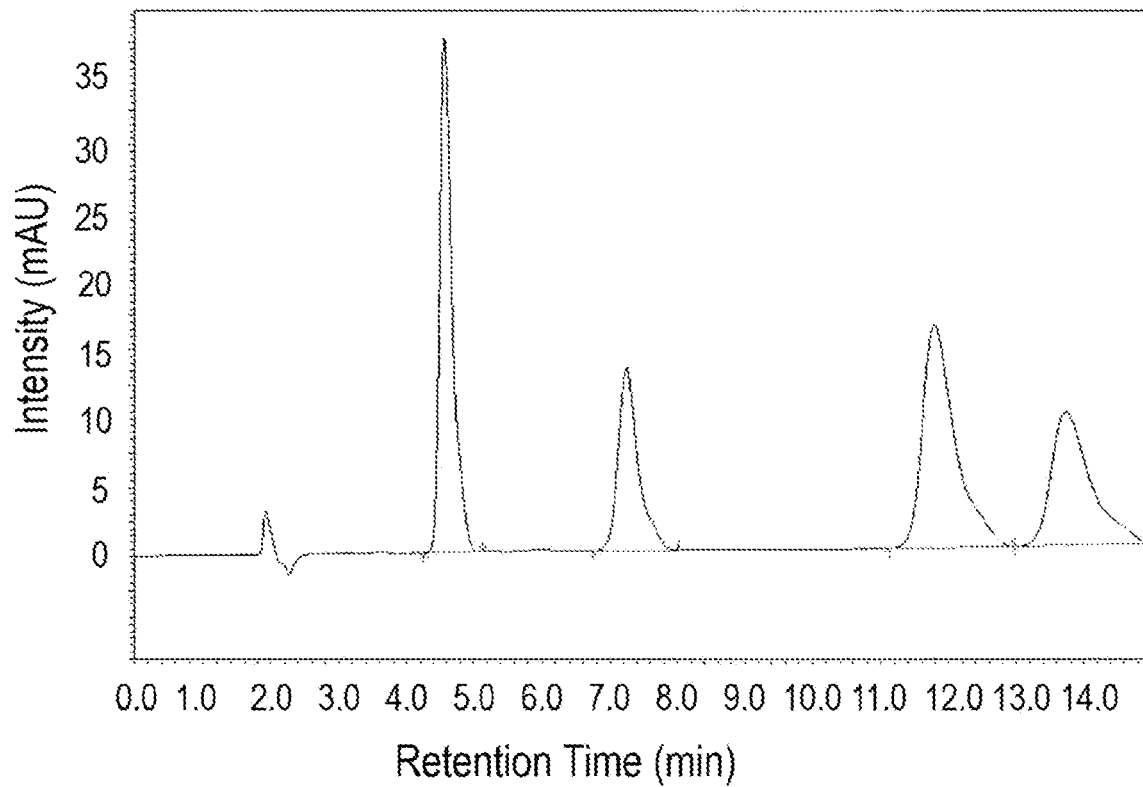
FIG. 5 is a liquid chromatogram of an aniline analog mixture in Example 3.

The obtained chromatogram is shown in FIG. 5. In FIG. 5, peaks attributed to 2-methylaniline, aniline, 3-methylaniline and 4-methylaniline were observed near retention times of 4.6 min, 7.3 unit 11.8 min, and 13.7 min, respectively.

Comparative Example 3: Separation of Aniline Analog Mixture

A sample was separated in the same manner as in Example 2 with the exception that the mobile phase B was used as the mobile phase.

Figure 6:
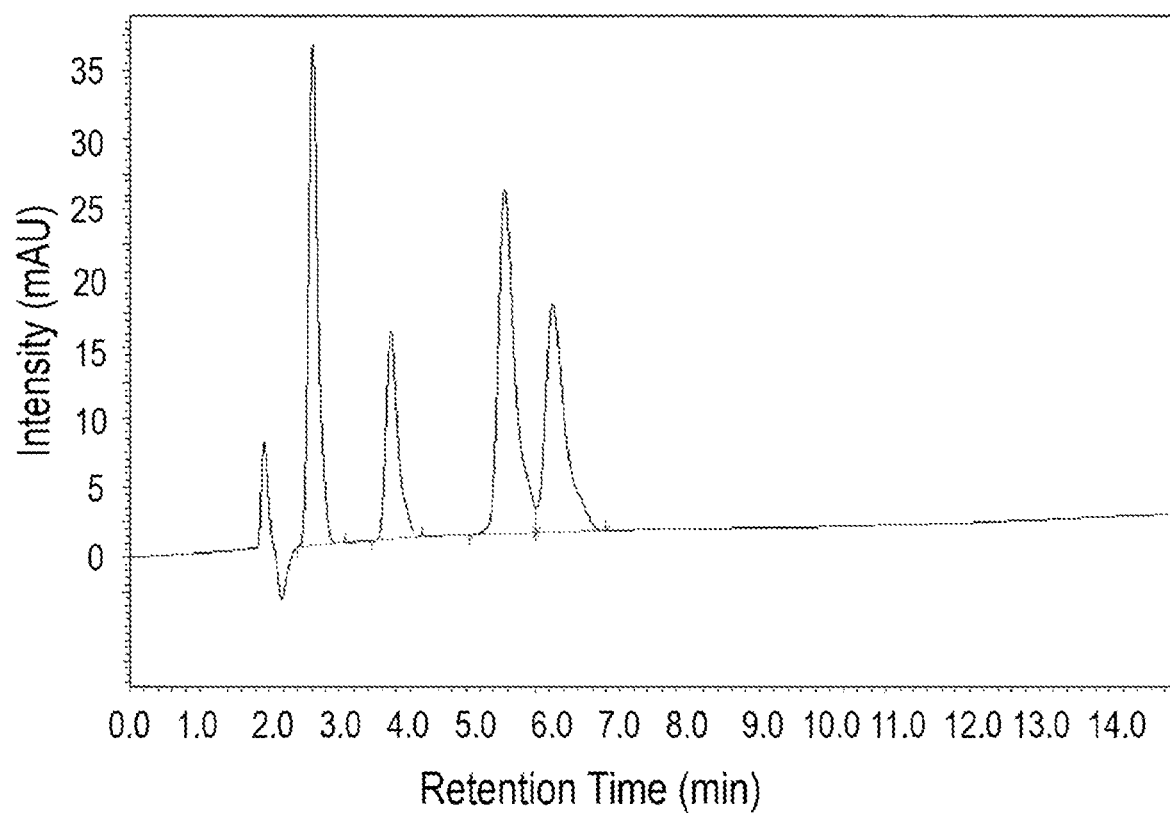
FIG. 6 is a liquid chromatogram of an aniline analog mixture in Comparative Example 3.

The obtained chromatogram is shown in FIG. 6. In FIG. 6, peaks attributed to 2-methylaniline, aniline 3-methylaniline and 4-methylaniline were observed near retention times of 2.6 min, 3.8 min, 5.4 min, and 6.2 min, respectively.

Comparative Example 3 is an example in a related art in which a mobile phase containing a perchloric acid aqueous solution having a pH of 1.79 Was used. From Comparative Example 3, it was confirmed that the aniline analog mixture was separated.

Example 2 is an experimental example in which a mobile phase containing a potassium hexafluorophosphate aqueous solution having a pH of 4.31 and hot containing an acid was used, and from Example 2, it was understood that a mixture of aniline analogs can be favorably separated without adding perchloric acid to the mobile phase.

Example 3 is an experimental example in which a mobile phase containing a potassium hexafluorophosphate aqueous solution having a. pH of 2.57 and containing formic acid was used. It was confirmed that the retention time of each aniline analog was longer in Example 3 than in Comparative Example 3 and Example 2. That is, Example 3 demonstrated that a mixture of aniline analogs was very favorably separated by using a mobile phase containing a salt of a chaotropic anion and an acid.

Example 4: Separation of Dl-1-Phenylethylamine

A sample was separated in the same manner as in Example 1 with the exception that the mobile phase D was used as the mobile phase and 1 µL of 1-phenylethylamine (0.1 mass % acetonitrile solution) was used as the sample.

Figure 7:
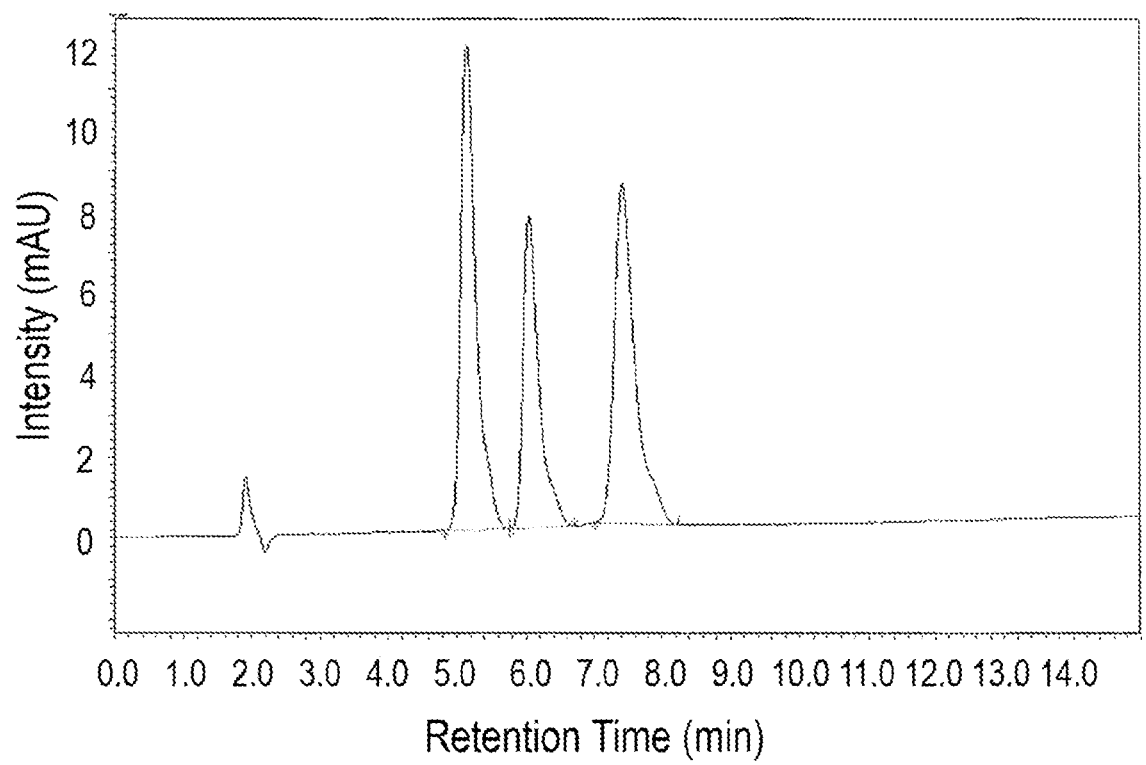
FIG. 7 is a liquid chromatogram of dl-1-phenylethylamine in Example 4.

The obtained chromatogram is shown in FIG. 7. In FIG. 7, peaks attributed to each enantiomer of 1-phenylethylamine were observed near retention times of 5.1 min and 7.4 min, respectively. Note that the peak near the retention time of 6.0 min was a peak attributed to impurities.

Example 5: Separation of Dl-1-Phenylethylamine

A sample was separated in the same manner as in Example 4 with the exception that the mobile phase E was used as the mobile phase.

Figure 8:
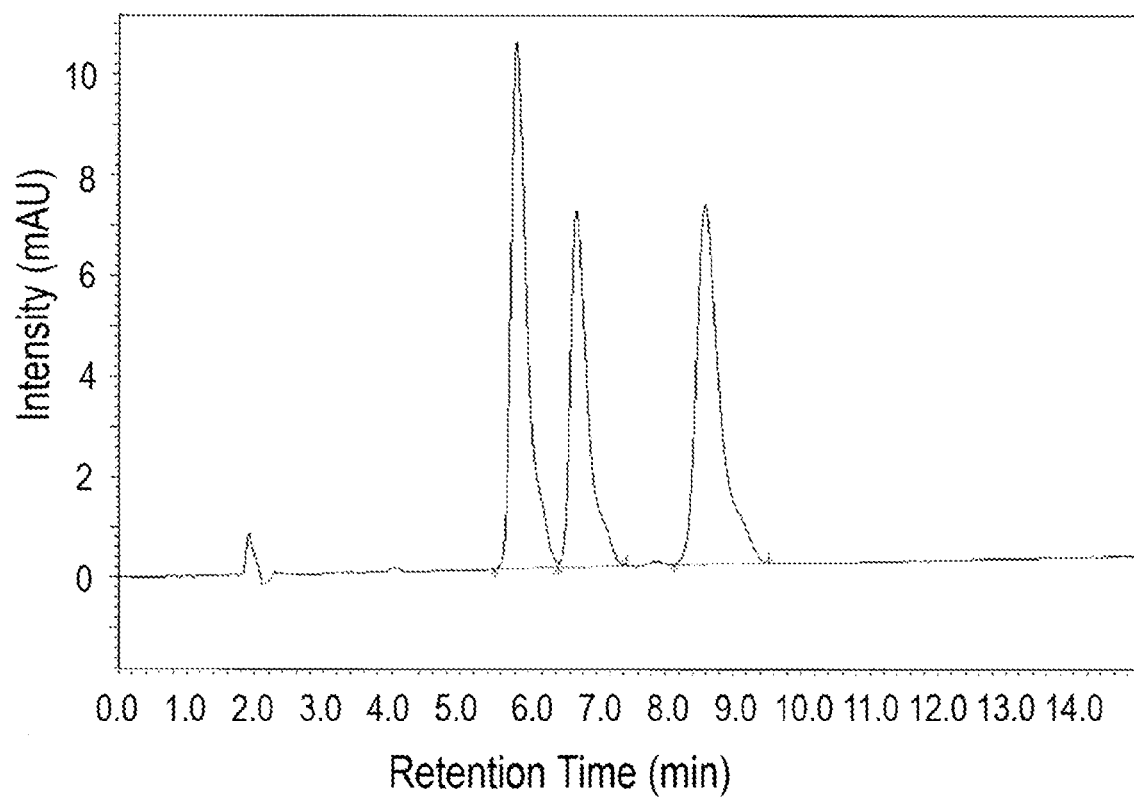
FIG. 8 is a liquid chromatogram of dl-1-phenylethylamine in Example 5.

The obtained chromatogram is shown in FIG. 8. In FIG. 8, peaks attributed to each enantiomer of 1-phenylethylamine were observed near retention times of 5.8 min and 8.6 min respectively. Note that the peak near the retention time of 6.7 min is a peak attributed to impurities.

Example 6: Separation of dl-1-Phenylethylamine

An aqueous solution of a salt of chaotropic anion was prepared by dissolving 1.31 g of formic acid in 1 L of a 20 mmol/L sodium tetrafluoroborate aqueous solution. A mobile phase F was then prepared by mixing the obtained aqueous solution of the salt of the chaotropic anion and acetonitrile at a volume ratio of 70:30. The composition of the mobile phase F and the pH at 25° C.) of the aqueous solution of the salt of the chaotropic anion are shown in Table 1.

A sample was separated in the same manner as in Example 4 with the exception e mobile phase F was used as the mobile phase.

Figure 9:
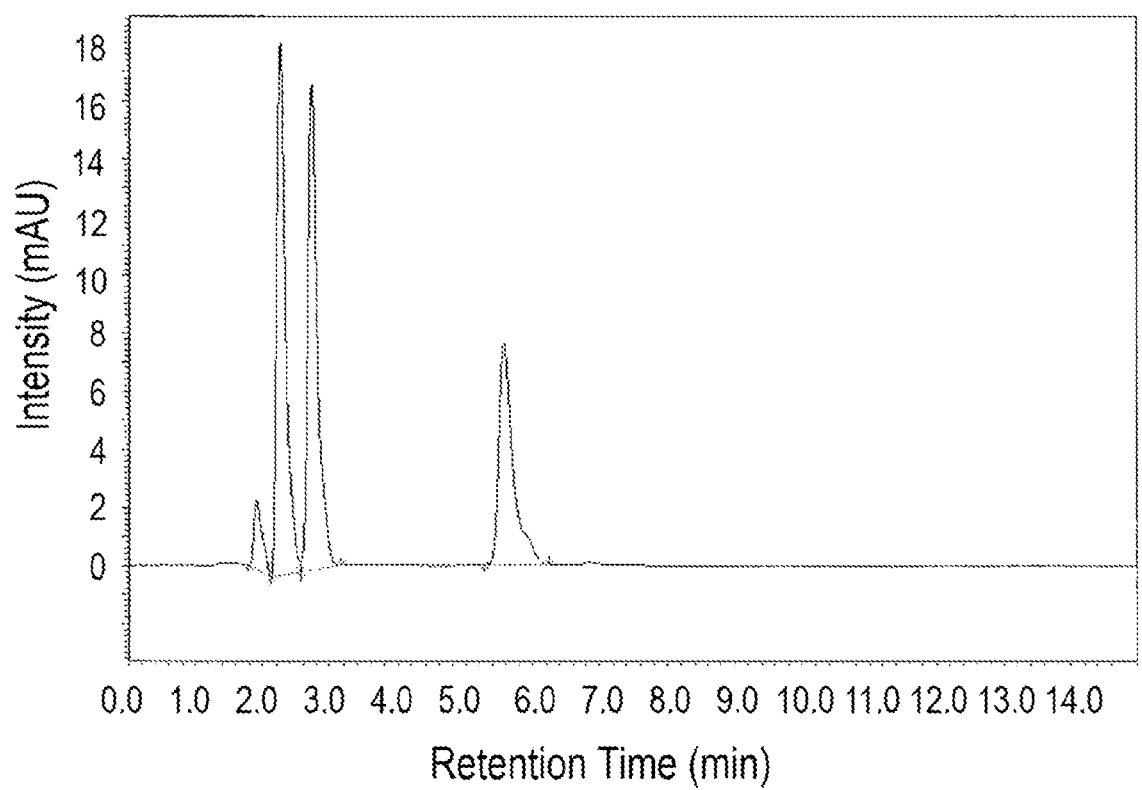
FIG. 9 is a liquid chromatogram of dl-1-phenylethylamine in Example 6.

The obtained chromatogram is shown in FIG. 9. In FIG. 9, peaks attributed to each enantiomer of 1-phenylethylamine were observed near retention times of 2.3 min and 2.7 min respectively. Note that the peak near the retention time of 5.6 min is a peak attributed to impurities.

Example 7: Separation of Dl-1-Phenylethylamine

An aqueous solution of a salt of a chaotropic anion was prepared by dissolving 1.31 g of formic acid in 1 L of an 80 mmol/L ammonium difluoroacetate aqueous solution. A mobile phase G was then prepared by mixing the obtained aqueous solution of the salt of the chaotropic anion and acetonitrile at a volume ratio of 70:30. The composition of the mobile phase G and the pH fat 25° C.) of the aqueous solution of the salt of the chaotropic anion are shown in Table 1.

A sample was separated in the same manner as in Example 4 with the exception that the mobile phase G was used as the mobile phase.

Figure 10:
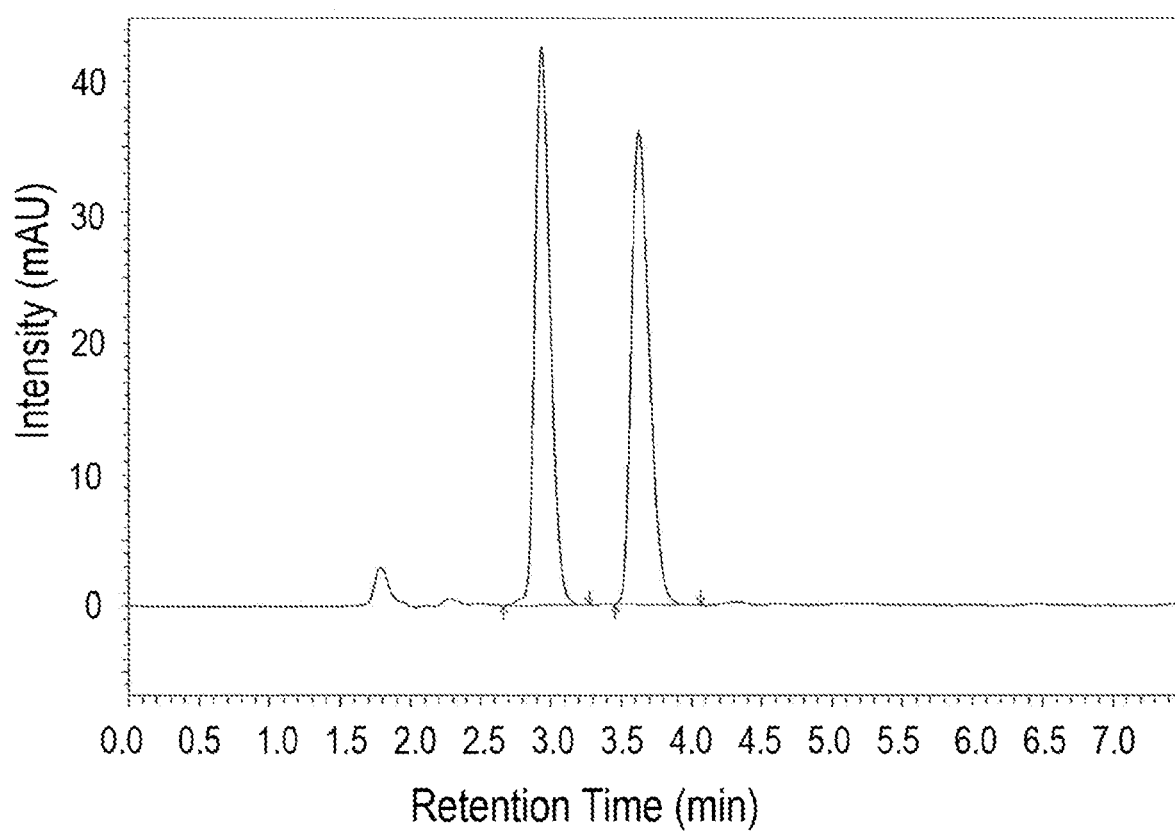
FIG. 10 is a liquid chromatogram of dl-1-phenylethylamine in Example 7.

The obtained chromatogram is shown in FIG. 10. In FIG. 10, peaks attributed to each enantiomer of 1-phenylethylamine were observed near retention times of 2.9 min and 3.6 min. respectively.

Example 8: Separation of Dl-1-Phenylethylamine

A mobile phase H was prepared by mixing a 20 mmol/L lithium perchlorate aqueous solution, which was an aqueous solution of a salt of a chaotropic anion, and acetonitrile at a volume ratio of 70:30. The composition of the mobile phase H and the pH (at 25° C.) of the aqueous solution of the salt of the chaotropic anion are shown in Table 1.

A sample was separated in the same manner as in Example 4 with the exception e mobile phase H was used as the mobile phase.

Figure 11:
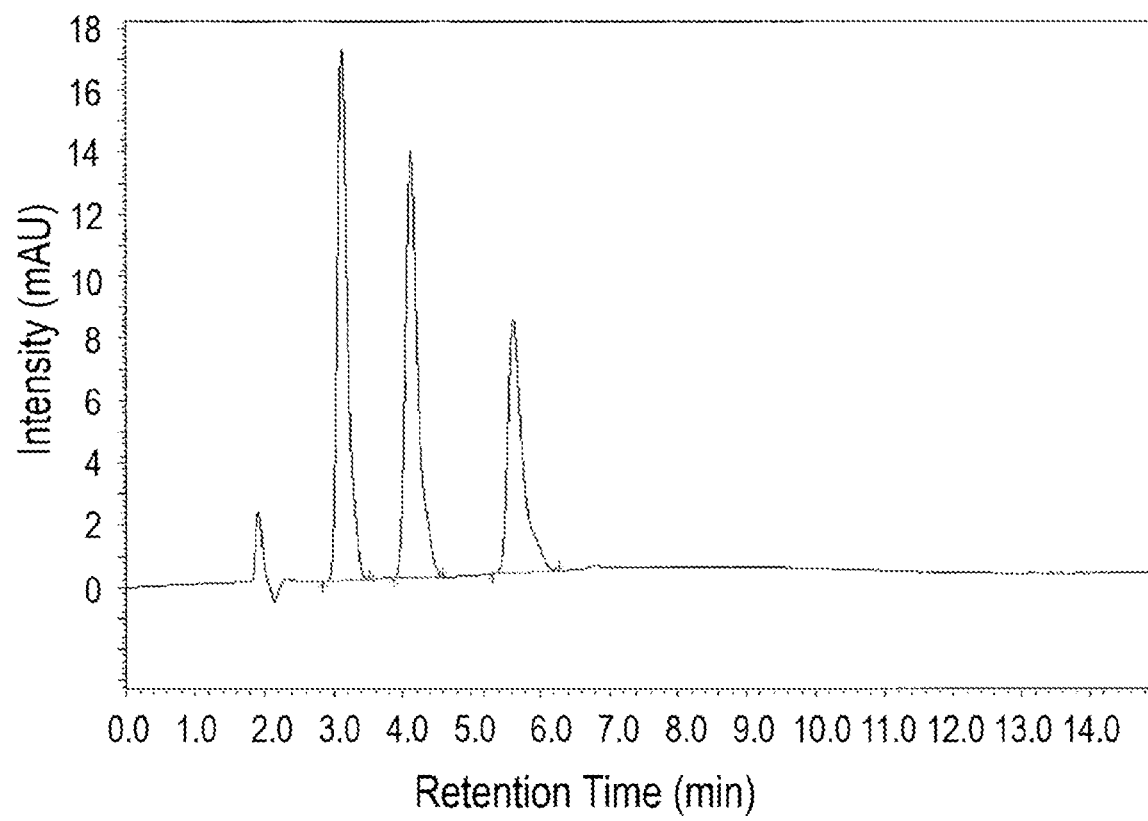
FIG. 11 is a liquid chromatogram of dl-1-phenylethylamine in Example 8.

The obtained chromatogram is shown in FIG. 11. In FIG. 11, peaks attributed to each enantiomer of 1-phenylethylamine were observed near retention times of 3.2 min and 4.2 min, respectively. Note that the peak near the retention time of 5.7 min is a peak attributed to impurities.

Comparative Example 4: Separation of Dl-1-Phenylethylamine

A sample was separated in the same manner as in Example 4 with the exception that the mobile phase B was used as the mobile phase.

Figure 12:
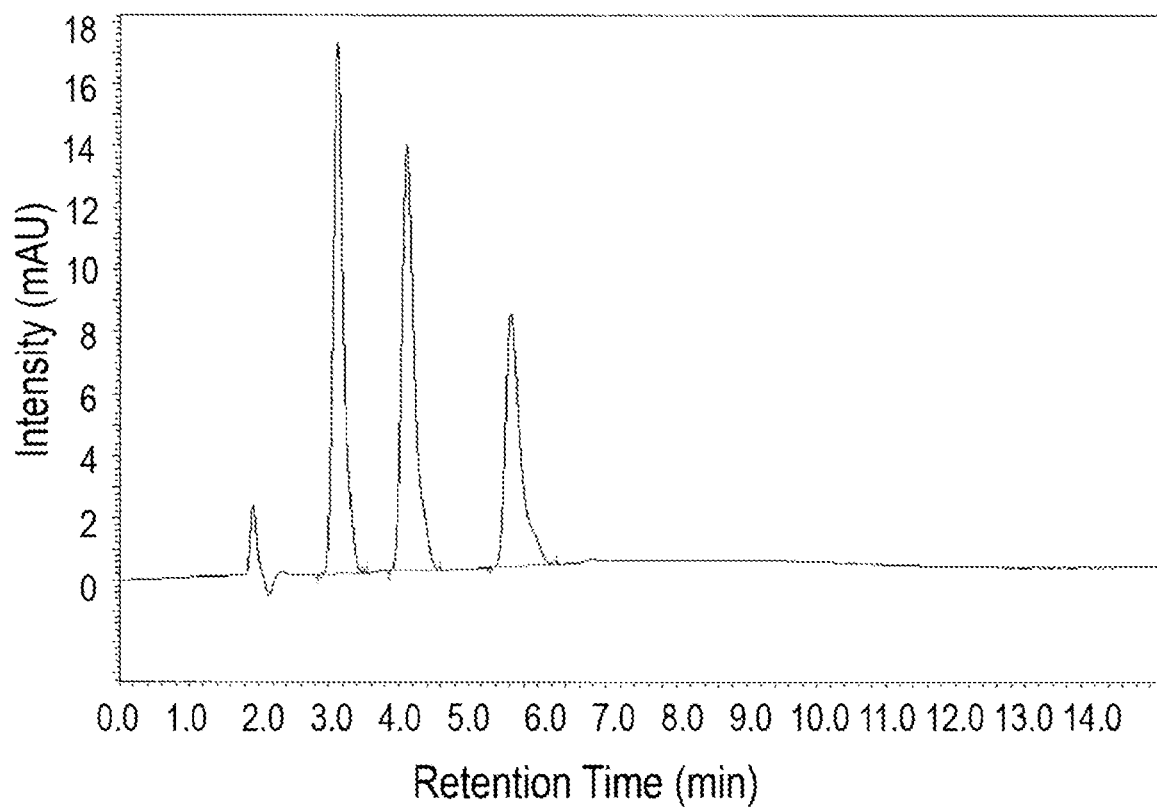
FIG. 12 is a liquid chromatogram of dl-1-phenylethylamine in Comparative Example 4.

The obtained chromatogram is shown in FIG. 12. In FIG. 12, peaks attributed to each enantiomer of 1-phenylethylamine were observed near retention times of 3.1 mm and 4.1 min, respectively. Note that the peak near the retention time of 5.6 min is a peak attributed to impurities.

Comparative Example 4 is an example in a related art in which a mobile phase containing a perchloric acid aqueous solution having a pH of 1.79 was used, and from Comparative Example 4, it was confirmed that the dl-phenylethylamine was separated into each enantiomer.

Example 4 is an experimental example in which a mobile phase containing a potassium hexafluorophosphate aqueous solution having a pH of 4.31 and not containing an acid was used and from Example 4, it was understood that dl-phenylethylamine can be favorably separated into each enantiomer without adding perchloric acid to the mobile phase.

Example 5 is an experimental example in which a mobile phase containing a potassium hexafluorophosphate aqueous solution having a pH of 2.57 and containing formic acid was used, and from Example 5, it was confirmed that the retention time of each enantiomer of dl-1-phenylethylamine is longer than that of Comparative Example 4 and Example 4. That is, Example 5 demonstrated that di-1-phenylethylamine is favorably retained in the crown ether-like cyclic structure and well separated into each enantiomer by using a mobile phase containing a salt of a chaotropic anion and an acid.

Example 6 is an experimental example in which the type of salt of the chaotropic anion differed from that of Example 5 while the pH was about the same. In Example 6 as well, it was confirmed that dl-1-phenylethylamine can be favorably separated into each enantiomer.

Furthermore, it was also found that when hexafluorophosphate anions are used as the chaotropic anions, the retention time is longer and the resolution is more superior than in a case in which tetrafluoroborate anions are used.

Example 7 is an experimental example in which a salt of trifluoroacetate, which has a lower chaotropic property than that of hexafluorophosphate ions (Examples 4, 5) and tetrafluoroborate ions (Example 6), was used as the salt of a chaotropic anion. It was continued that even with chaotropic anions having a low chaotropic property, separation performance comparable to that of Examples 4 to 6 was exhibited by increasing the concentration.

Example 8 is an experimental example in which the pH of the aqueous solution of a salt of a chaotropic anion was increased. It was found that dl-1-phenylethylamine can be favorably separated into each enantiomer even at a higher pH value of 7.29.

TABLE 1

| | | Aqueous Solution | | | | | |
|---|---|---|---|---|---|---|---|
| | | Salt of a Chaotropic Anion | Chaotropic Anion Concentration (mmol/L) | Acid | Acid Concentration (mmol/L) | pH | Organic Solvent | Aqueous Solution:Organic Solvent (volume ratio) |
| Mobile Phase A | Example 1 | LiClO$_4$ | 20 | HCO$_2$H | 29 | 2.60 | Acetonitrile | 70:30 |
| Mobile Phase B | Comparative Example 1, 3, 4 | — | — | HClO$_4$ | 20 | 1.79 | Acetonitrile | 70:30 |
| Mobile Phase C | Comparative Example 2 | — | — | HCO$_2$H | 29 | 2.64 | Acetonitrile | 70:30 |
| Mobile Phase D | Example 2, 4 | KPF$_6$ | 20 | — | — | 4.31 | Acetonitrile | 70:30 |
| Mobile Phase E | Example 3, 5 | KPF$_6$ | 20 | HCO$_2$H | 29 | 2.57 | Acetonitrile | 70:30 |
| Mobile Phase F | Example 6 | NaBF$_4$ | 20 | HCO$_2$H | 29 | 2.60 | Acetonitrile | 70:30 |
| Mobile Phase G | Example 7 | CF$_3$CO$_2$NH$_4$ | 80 | HCO$_2$H | 29 | 2.65 | Acetonitrile | 70:30 |
| Mobile Phase H | Example 8 | LiClO$_4$ | 20 | — | — | 7.29 | Acetonitrile | 70:30 |

Example 9: Separation of Aniline Analog Mixture

A mobile phase I was prepared by mixing an aqueous solution of a sail of a hydrophobic organic acid having a formic acid concentration of 30 mmol/L of and a sodium octanesulfonate concentration of 20 mmol/L and acetonitrile at a volume ratio of 70:30. The composition of the mobile phase I and the pH (at 25° C.) of the aqueous solution of the salt of a hydrophobic organic acid are shown in Table 2.

A sample was separated in the same manner as in Example 1 with the exception that the mobile phase I was used as the mobile phase, and 1 μL of a mixture of 2-methylaniline, 3-methylaniline, and 4-methylaniline (acetonitrile solution having a concentration of each compound of from 0.02 to 0.03 mass %) was used as the sample.

Figure 13:
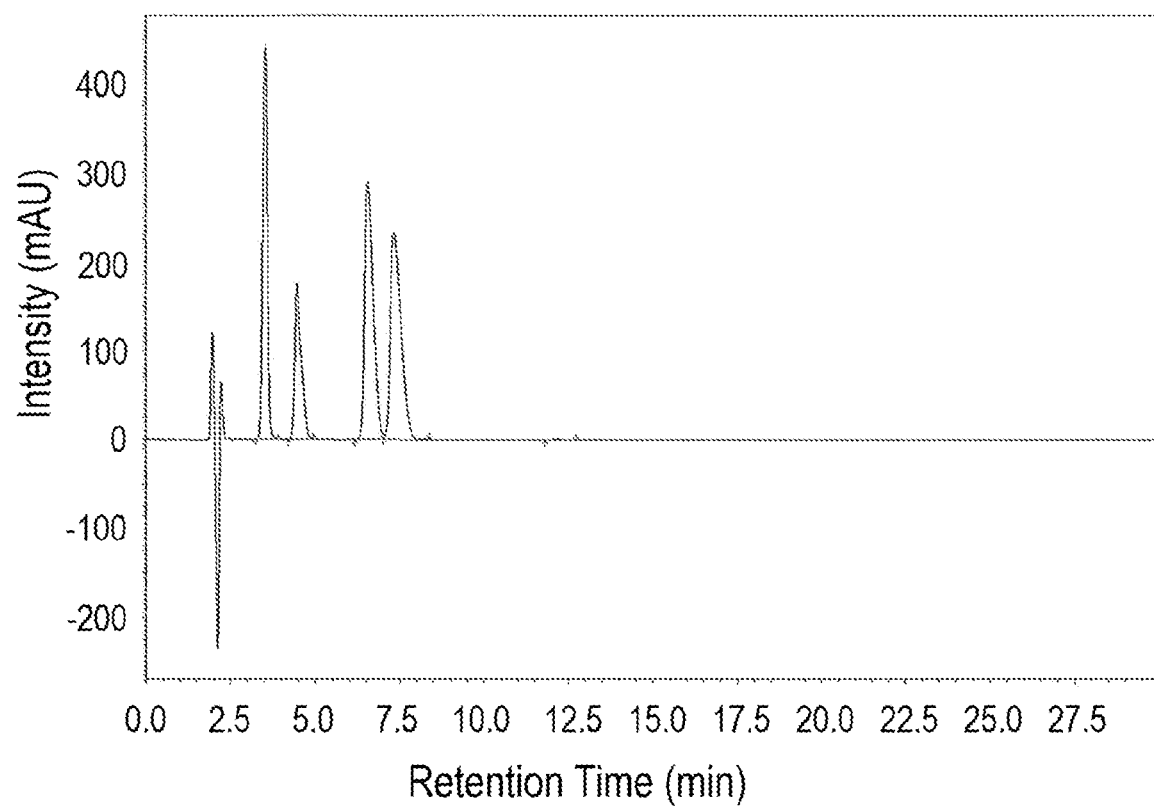
FIG. 13 is a liquid chromatogram of an aniline analog mixture in Example 9.

The obtained chromatogram is shown in FIG. 13. Its. FIG. 13, peaks attributed to 2-methylaniline, aniline, 3-methylaniline and 4-methylaniline were observed near retention nines of 3.5 min, 4.5 min, 6.5 min and 7.3 min., respectively, Example 9 is an experimental example in which the type of salt of the hydrophobic anion differed from that of Example 3 while the pH was about the same. In Example 9 in which sodium octanesulfonate, which is a salt of a hydrophobic organic acid, was used as the salt of a hydrophobic anion, the retention time was shorter than that of Example 3 in which potassium hexafluorophosphate was used as the salt of the hydrophobic anion. However, it was found in Example 9 that the mixture of aniline analogs can be favorably separated without adding perchloric acid to the mobile phase. In addition, the liquid chromatogram peak in Example 9 was narrower than in Example 3. That is, Example 9 demonstrated that the salt of the hydrophobic organic acid included in the mobile phase contributed to good separation.

Example 10: Separation of Dl-1-Phenylethylamine

A sample was separated in the same manner as in Example 4 with the exception that the mobile phase I was used as the mobile phase.

Figure 14:
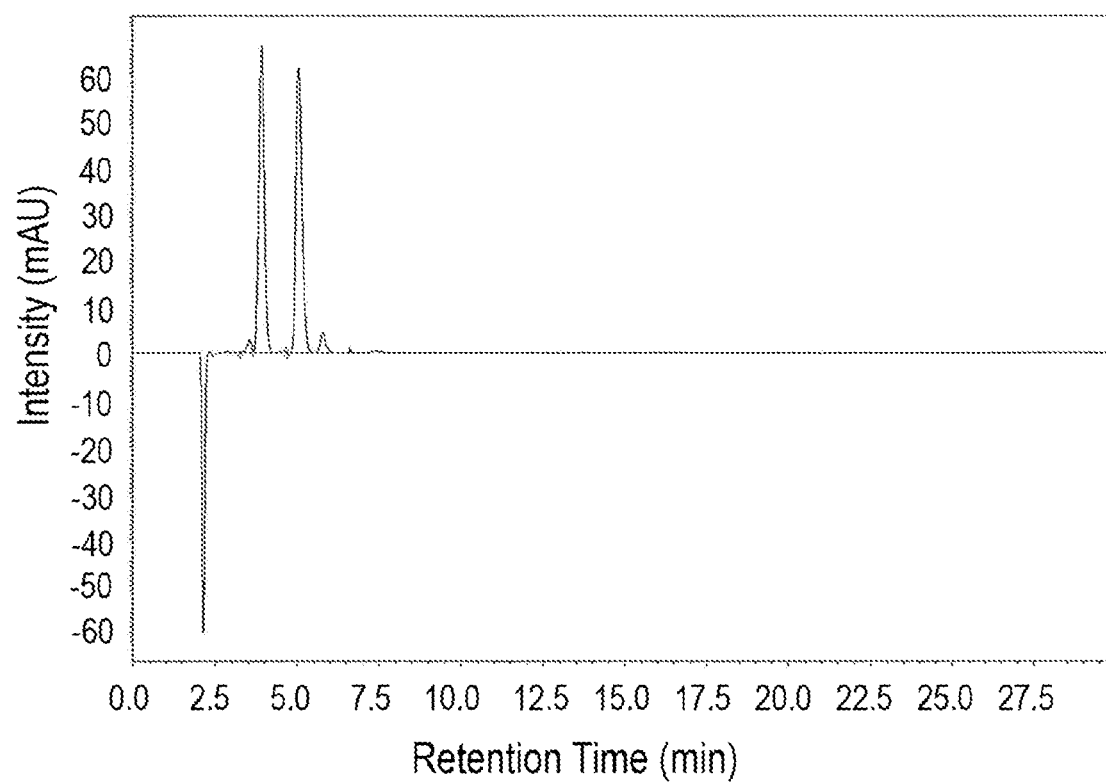
FIG. 14 is a liquid chromatogram of dl-1-phenylethylamine in Example 10.

The obtained chromatogram is shown in FIG. 14. In FIG. 14, peaks attributed to each enantiomer of 1-phenylethylamine were observed near retention times of 3.9 min and 5.1 min, respectively.

Example 11: Separation of Dl-1-Phenylethylamine

A mobile phase J was prepared by mixing an aqueous solution of a salt of a hydrophobic organic acid having a formic acid concentration of 30 mmol/L and a sodium decanesulfonate concentration of 20 mmol/L, and acetonitrile at a volume ratio of 70:30. The composition of the mobile phase J is shown in Table 2.

A sample was separated in the same manner as in Example 10 with the exception that the mobile phase J was used as the mobile phase.

Figure 15:
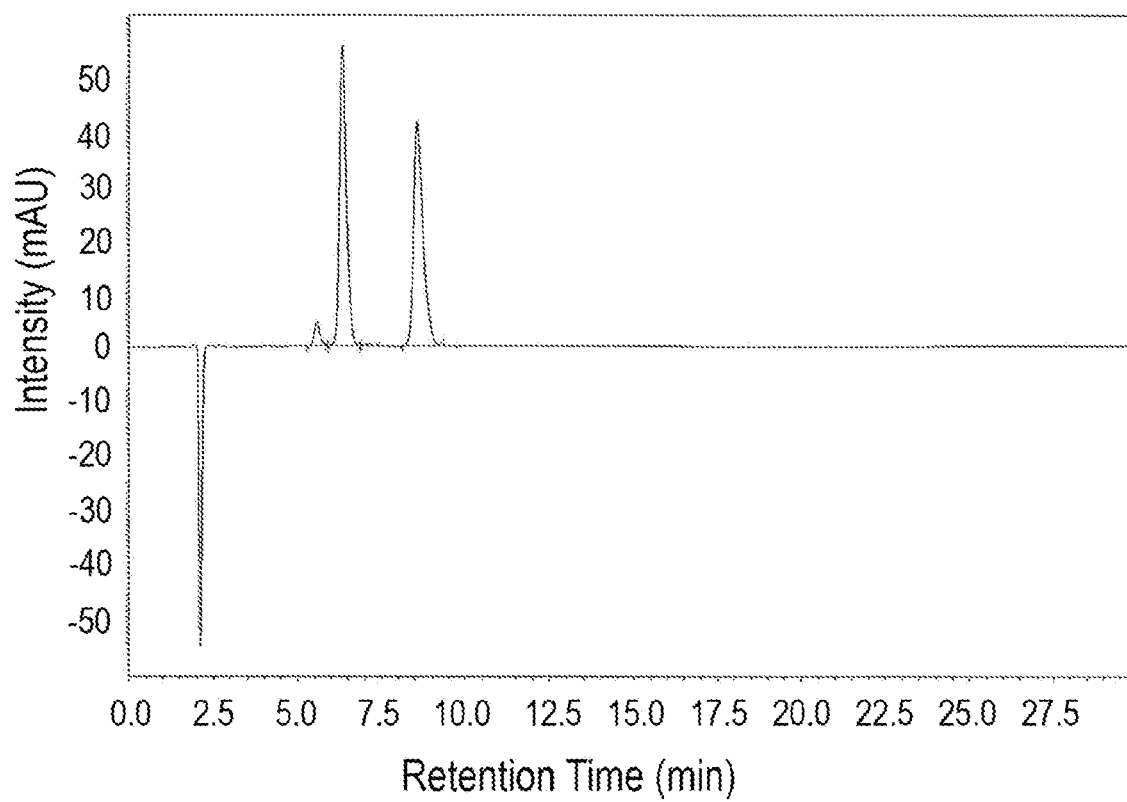
FIG. 15 is a liquid chromatogram of dl-1-phenylethylamine in Example 11.

The obtained chromatogram is shown in FIG. 15. In FIG. 15, peaks attributed to each enantiomer of 1-phenylethylamine were observed near retention times of 6.3 min and 8.6 min respectively.

Example 12: Separation of Dl-1-Phenylethylamine

A mobile phase K was prepared by mixing an aqueous solution of a salt of a hydrophobic organic acid having a formic acid concentration of 30 mmol/L and a sodium hexanesulfonate concentration of 20 mmol/L, and acetonitrile at a volume ratio of 70:30. The composition of the mobile phase K is shown in Table 2.

A sample was separated in the same manner as in Example 10 with the exception that the mobile phase K was used as the mobile phase.

Figure 16:
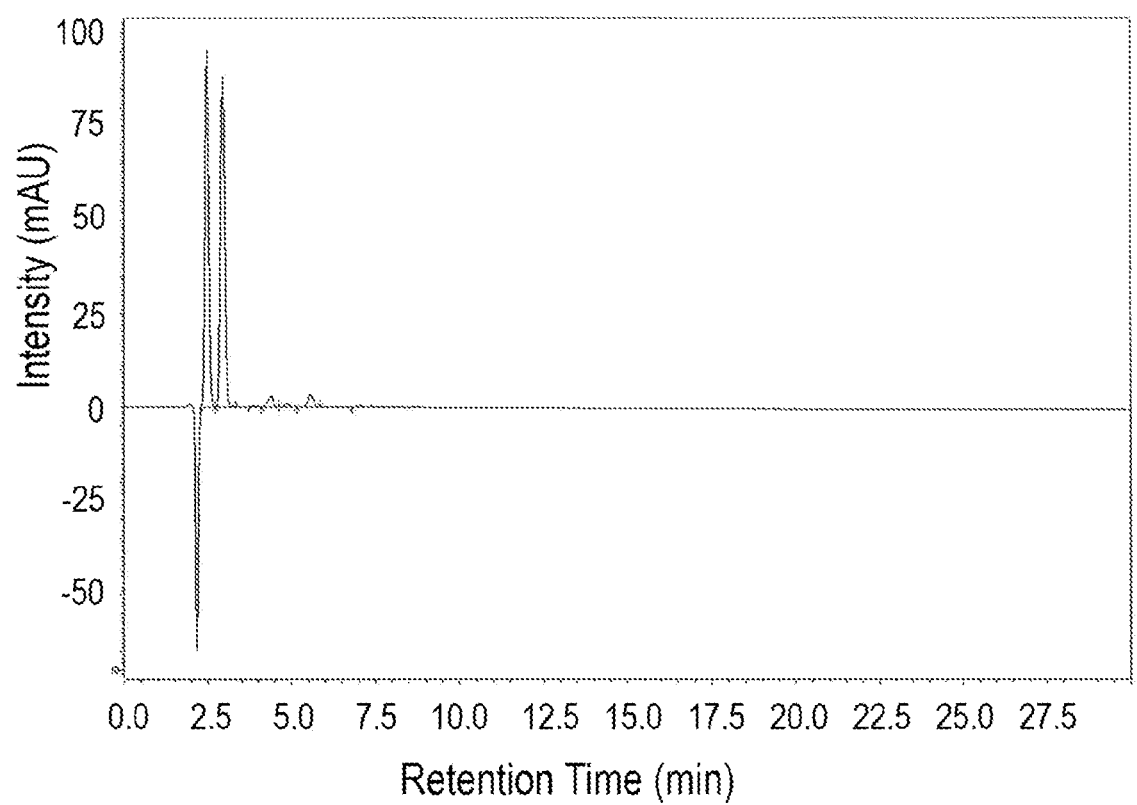
FIG. 16 is a liquid chromatogram of dl-1-phenylethylamine in Example 12.

The obtained chromatogram is shown in FIG. 16. In FIG. 16, peaks attributed to each enantiomer of 1-phenylethylamine were observed near retention times of 2.5 min and 2.9 min, respectively.

Examples 10, 11, and 12 are experimental examples in which a mobile phase containing formic acid along with an aqueous solution of a sodium alkane sulfonate of 8, 10, and 6 carbons, respectively, was used, and in each of these examples, it was demonstrated that dl-1-phenylethylamine can be successfully separated into each enantiomer without adding perchloric acid to the mobile phase.

Furthermore, from these examples, it was found that as the number of carbons of the hydrophobic organic increased, the retention time of each enantiomer of the dl-1-phenylethylamine increased, and as the number of cut is in the hydrophobic organic group decreased, the peak of the liquid chromatogram became narrower.

Comparative Example 5: Separation of Dl-1-Phenylethylamine

A mobile phase L was prepared by mixing an aqueous solution having a formic acid concentration of 30 mmol/L and a sodium methanesulfonate concentration of 20 mmol/L, and acetonitrile at a volume ratio of 70:30. The composition of the mobile phase L is shown in Table 2.

A sample was separated in the same manner as in Example 10 with the exception that the mobile phase L was used as the mobile phase.

Figure 17:
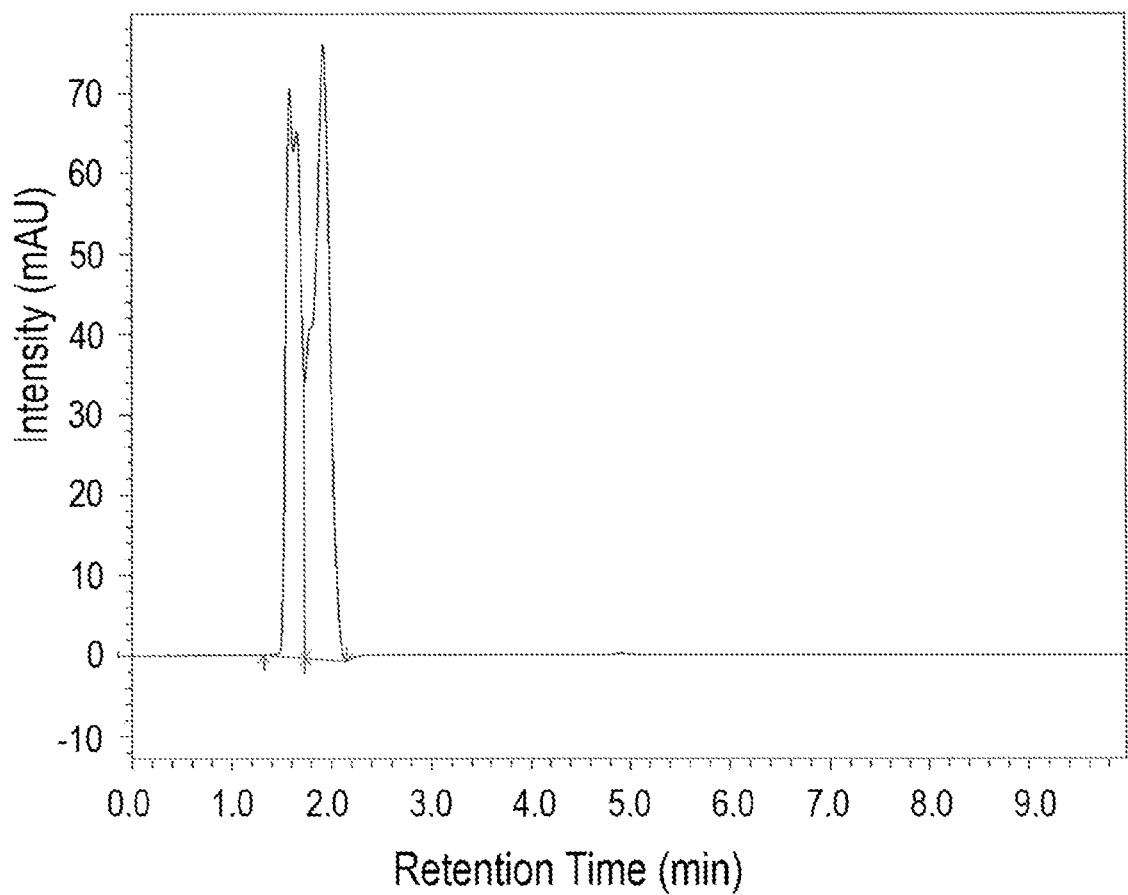
FIG. 17 is a liquid chromatogram of dl-1-phenylethylamine in Comparative Example 5.

The obtained chromatogram is shown in FIG. 17. In FIG. 17 peaks attributed to each enantiomer of 1-phenylethylamine were observed near retention times of 1.6 mm and 1.9 min. respectively.

Comparative Example 5 is an experimental example in which dl-1-phenylethylamine was separated under the same conditions as in Examples 10 to 12 with the exception that sodium methanesulfonate was used instead of a sodium alkane sulfonate having from 6 to 10 carbons. Methanesulfonic acid is an alkane sulfonic acid having one carbon and is not sufficiently hydrophobic. Thus, methanesulfonic acid does not correspond to the hydrophobic organic acid in the present disclosure. In Comparative Example 5, in which sodium methanesulfonate was used, it was confirmed that the retention time of dl-1-phenylethylamine was short, and an effect of improving the amine retention force was not obtained. Also, in Comparative Example 5, the peak of each of the enantiomers of dl-1-phenylethylamine overlapped in the liquid chromatogram. That is, even though methanesulfonic acid was added to the mobile phase, which did not contain perchloric acid, it was continued that the chiral amines could not be separated for each enantiomer.

TABLE 2

| | | Aqueous Solution of Salt of a Hydrophobic Organic Acid | | | | | |
|---|---|---|---|---|---|---|---|
| | | Salt of Hydrophobic Organic Acid | Concentration of Salt of Hydrophobic Organic Acid (mmol/L) | Acid | Acid Concentration (mmol/L) | pH | Organic Solvent | Aqueous Solution:Organic Solvent (volume ratio) |
| Mobile Phase I | Examples 9, 10 | Sodium octanesulfonate | 20 | $HCO_2H$ | 30 | 2.86 | Acetonitrile | 70:30 |
| Mobile Phase J | Example 11 | Sodium decanesulfonate | 20 | $HCO_2H$ | 30 | —*2 | Acetonitrile | 70:30 |
| Mobile Phase K | Example 12 | Sodium hexanesulfonate | 20 | $HCO_2H$ | 30 | —*2 | Acetonitrile | 70:30 |
| Mobile Phase L | Comparative Example 5 | Sodium methanesulfonate*1 | 20 | $HCO_2H$ | 30 | —*2 | Acetonitrile | 70:30 |

*1Methanesulfonic acid is an alkanesulfonic acid with one carbon and is not sufficiently hydrophobic, and therefore sodium methanesulfonate does not correspond to the "salt of a hydrophobic organic acid" in the present disclosure.
*2Similar to the mobile phase I, which has approximately the same formic acid concentration, the pH is assumed to be approximately 2.86.

According to separation methods pertaining to at least several embodiments of the present disclosure, amities can be separated through liquid chromatography without the need to add a large amount of perchloric acid to the mobile phase. Accordingly, such separation methods can be widely used in fields such as organic chemistry, medicine, and pharmacology, in which analysis, purification, and the like are performed b various liquid chromatography.

The invention claimed is:

1. A separation method for amine, the separation method comprising:
    performing liquid chromatography,
        wherein a separating agent in which a ligand having a crown ether-like cyclic structure is supported on a carrier is used as a stationary phase, and
        wherein a mobile phase comprises an aqueous solution of a salt of a hydrophobic organic acid.

2. The separation method according to claim 1, wherein the hydrophobic organic acid is a hydrophobic organic acid including: at least one acid group selected from the group consisting of a sulfate group, a sulfonic acid group, and a phosphoric acid group;
    and an alkyl group having from 4 to 18 carbons.

3. The separation method according to claim 1, wherein the hydrophobic organic acid is an alkanesulfonic acid having from 4 to 18 carbons.

4. The separation method according to claim 1, wherein pH of the aqueous solution is from 1.0 to 8.0.

5. The separation method according to claim 1, wherein the mobile phase comprises an acid other than a hydrophobic organic acid and perchloric acid.

6. The separation method according to claim 5, wherein the acid is formic acid.

7. The separation method according to claim 1, wherein the amine is a primary amine.

8. A separation method for amine, the separation method comprising: performing liquid chromatography,
    wherein a separating agent in which a ligand having a crown ether-like cyclic structure is supported on and chemically bound to a carrier is used as a stationary phase,
    wherein a mobile phase comprises an aqueous solution of a salt of a chaotropic anion, and
    wherein the mobile phase does not contain perchloric acid.

9. The separation method according to claim 8, wherein the chaotropic anion is at least one selected from the group consisting of $PF_6^-$, $BF_4^-$, $ClO_4^-$, $CF_3SO_3^-$, $FSO_3^-$, $(CF_3SO_2)_2N^-$, $PCl_6^-$, $SbCl_6^-$, $CF_3CO_2^-$, $CCl_3CO_2^-$, $NO_3^-$ and $ClO_3^-$.

10. The separation method according to of claim 8, wherein pH of the aqueous solution is from 1.0 to 8.0.

11. The separation method according to claim 8, wherein the mobile phase comprises an acid other than a hydrophobic organic acid and perchloric acid.

12. The separation method according to claim 11, wherein the acid is formic acid.

13. The separation method according to claim 8, wherein the amine is a primary amine.

* * * * *